United States Patent
Urushibata et al.

(10) Patent No.: US 10,524,545 B2
(45) Date of Patent: Jan. 7, 2020

(54) TONGUE FOR SEATBELT DEVICE

(71) Applicant: KABUSHIKI KAISHA TOKAI-RIKA-DENKI-SEISAKUSHO, Aichi-ken (JP)

(72) Inventors: Tetsushi Urushibata, Aichi-ken (JP); Daiki Kato, Aichi-ken (JP); Kosuke Tanaka, Aichi-ken (JP)

(73) Assignee: KABUSHIKI KAISHA TOKAI-RIKA-DENSKI-SEISAKUSHO, Aichi-ken (JP)

( * ) Notice: Subject to any disclaimer, the term of this patent is extended or adjusted under 35 U.S.C. 154(b) by 133 days.

(21) Appl. No.: 15/926,061

(22) Filed: Mar. 20, 2018

(65) Prior Publication Data
US 2018/0271225 A1    Sep. 27, 2018

(30) Foreign Application Priority Data

Mar. 27, 2017 (JP) ................. 2017-061548
Mar. 27, 2017 (JP) ................. 2017-061549

(51) Int. Cl.
*A44B 11/25* (2006.01)
*B60R 22/18* (2006.01)

(52) U.S. Cl.
CPC .......... *A44B 11/2561* (2013.01); *B60R 22/18* (2013.01); *B60R 2022/1812* (2013.01)

(58) Field of Classification Search
CPC ................ A44B 11/2561; B60R 22/18; B60R 2022/1812
See application file for complete search history.

(56) References Cited

FOREIGN PATENT DOCUMENTS

JP          2016-60458 A    4/2016
WO   WO-2012105762 A2 *  8/2012 ............. A44B 11/00

* cited by examiner

*Primary Examiner* — Robert Sandy
(74) *Attorney, Agent, or Firm* — Roberts Mlotkowski Safran Cole & Calderon P.C.

(57) ABSTRACT

At a present tongue, a vertical rib is provided between a first elastic piece and a second elastic piece of a cover. When a guide bar is displaced toward a vehicle rear side, and the guide bar abuts the first elastic piece and the second elastic piece, the guide bar abuts the vertical rib. Due thereto, imparting of load to the first elastic piece and the second elastic piece by the guide bar can be suppressed, and elastic deformation of the first elastic piece and the second elastic piece can be suppressed.

18 Claims, 9 Drawing Sheets

TONGUE FOR SEATBELT DEVICE

CROSS-REFERENCE TO RELATED APPLICATION

This application claims priority under 35 USC 119 from Japanese Patent Applications No. 2017-061548 filed Mar. 27, 2017 and No. 2017-061549 filed Mar. 27, 2017, the disclosures of which are incorporated by reference herein.

BACKGROUND

Field of the Invention

The present disclosure relates to a tongue for a seatbelt device that engages with the buckle of a seatbelt device.

Related Art

In the tongue disclosed in Japanese Patent Application Laid-Open (JP-A) No. 2016-60458, length direction both end portions of a shaft are disposed within both fixing holes of a mold portion, and, due thereto, the shaft is supported at the mold portion. Caps are provided at the mold portion, and the both fixing holes are closed-off by the caps from the length direction outer sides of the shaft.

There is a so-called snap-fit structure as an example of assembling an assembled member such as the cap to a member to be assembled to such as a tongue main body that includes the mold portion, or the like. In a snap-fit structure, at the time of assembling an assembled member to a member to be assembled to such as a tongue main body or the like, by a holding portion that is provided at one of the assembled member or the member to be assembled to such as the tongue main body or the like, an elastic portion, which is provided at another of the assembled member and the member to be assembled to such as the tongue main body or the like is elastically deformed. When the assembled member has been assembled to the member to be assembled to such as the tongue main body or the like, the elastic deformation of the elastic portion is cancelled, and the elastic portion is held by the holding portion.

In such a snap-fit structure, there is the possibility that, due to the elastic portion receiving load in a state in which the assembled member is assembled to the member to be assembled to such as the tongue main body or the like, the elastic portion may be elastically deformed in a direction such that the holding of the elastic portion by the holding portion is canceled.

SUMMARY

In consideration of the above-described circumstances, a tongue for a seatbelt device that can maintain the holding of an elastic portion by a holding portion is provided.

A tongue for a seatbelt device of a first aspect includes: a tongue main body that has an insertion portion, which is configured to be inserted into a buckle of a seatbelt device, and an insert-through portion through which a webbing is inserted; an assembled member that is assembled to the tongue main body; a holding portion that is provided at one of the tongue main body or the assembled member; an elastic portion that is provided at another of the tongue main body or the assembled member, at a time at which the assembled member is being assembled to the tongue main body, the elastic portion being elastically deformed in a deforming direction by the holding portion, and, in a state in which the assembled member is assembled to the tongue main body, elastic deformation of the elastic portion in the deforming direction being cancelled, and the elastic portion being engaged with the holding portion and being held by the holding portion; and a load receiving portion that is provided at the tongue main body or the assembled member, and that, in the state in which the assembled member is assembled to the tongue main body, receives a load in a direction intersecting the deforming direction, and suppresses application of the load to the elastic portion.

In accordance with the tongue for a seatbelt device of the first aspect, at the time of assembling the assembled member to the tongue main body, the elastic portion, which is provided at the another of the tongue main body and the assembled member, is elastically deformed in the deforming direction by the holding portion that is provided at the one of the tongue main body and the assembled member. When the assembled member is assembled to the tongue main body, the elastic deformation of the elastic portion in the deforming direction is cancelled, and the elastic portion is engaged with the holding portion, and the elastic portion is held by the holding portion. Due thereto, the assembled member coming apart from the tongue main body can be suppressed.

On the other hand, the load receiving portion is provided at the tongue main body or the assembled member. In the state in which the assembled member is assembled to the tongue main body, the load receiving portion receives load in a direction that intersects the deforming direction, and this load being applied to the elastic portion is suppressed. Due thereto, the elastic portion being elastically deformed in the deforming direction by this load can be suppressed, and holding of the elastic portion by the holding portion can be maintained. Therefore, the assembled member coming apart from the tongue main body can be suppressed.

In a tongue for a seatbelt device of a second aspect, the tongue for a seatbelt device of the first aspect further includes a load imparting member that is configured to be displaced with respect to the one of the tongue main body or the assembled member, wherein the load receiving portion is disposed so as to face the load imparting member at a displacing direction side of the load imparting member, and, due to the load imparting member abutting the load receiving portion, displacement of the load imparting member is suppressed, and imparting of the load from the load imparting member to the elastic portion is suppressed.

In accordance with the tongue for a seatbelt device of the second aspect, the load receiving portion is disposed so as to face the load imparting member at the displacement direction side of the load imparting member. Displacement of the load imparting member is suppressed due to the load imparting member abutting the load receiving portion. Due thereto, imparting of load to the elastic portion from the load imparting member due to displacement of the load imparting member is suppressed.

In a tongue for a seatbelt device of a third aspect, in the tongue for a seatbelt device of the first or second aspect, the elastic portion provided at the another of the tongue main body or the assembled member has a pair of elastic members, the deforming direction of the elastic portion by the holding portion is a direction in which one of the elastic members moves away from another of the elastic members, and the load receiving portion is disposed between the pair of the elastic members.

In accordance with the tongue for a seatbelt device of the third aspect, another of the tongue main body and the assembled member has a pair of the elastic members, and the load receiving portion is disposed between the pair of elastic members. Due thereto, an object entering-in between the pair of elastic members can be suppressed. Such an object entering-in between the pair of elastic members and pushing the pair of elastic members can be suppressed. One of the pair of elastic members being elastically deformed in a direction of moving away from the another relatively due to the receiving of load from such an object can be suppressed.

In a tongue for a seatbelt device of a fourth aspect, in the tongue for a seatbelt device of any one of the first through third aspects, the deforming direction of the elastic portion by the holding portion at the time at which the assembled member is being assembled to the tongue main body is a rotation direction whose center of rotation is a portion of the elastic portion, which portion is at a side opposite an application direction side of the load, and the load receiving portion is disposed further toward a side of the portion, to which the load is imparted, of the elastic portion than a center of rotation that is due to elastic deformation of the elastic portion.

In accordance with the tongue for a seatbelt device of the fourth aspect, the load receiving portion is disposed further toward the side of the portion, to which the load is imparted, at the elastic portion than a center of rotation due to elastic deformation of the elastic portion. Therefore, even if load is imparted to the elastic portion at the side of the load receiving portion which side is opposite the side at which the center of rotation due to elastic deformation of the elastic portion is located, the load receiving portion there between, the imparted position of the load at the elastic portion is apart from the center of the rotation that is due to elastic deformation of the elastic portion. Therefore, the elastic deformation of the elastic portion can be made to be small.

In a tongue for a seatbelt device of a fifth aspect, the tongue for a seatbelt device of any one of the first through fourth aspects further includes: a clamp member that is provided at the tongue main body so as to be movable with respect to the tongue main body, and that, by being moved, nips the webbing between the tongue main body and the clamp member; and a supporting member that is provided at the tongue main body and supports the clamp member, wherein: the assembled member suppresses movement of the supporting member with respect to the tongue main body, and the load receiving portion receives the load that arises due to the supporting member moving with respect to the tongue main body.

In accordance with the tongue for a seatbelt device of the fifth aspect, the load, which arises due to the supporting member that supports the clamp member moving with respect to the tongue main body, is received by the load receiving portion. Due thereto, the assembled member coming apart from the tongue main body due to such load can be suppressed. Therefore, suppression of movement of the supporting member by the assembled member can be maintained, and the supporting member moving with respect to the tongue main body can be maintained.

A tongue for a seatbelt device of a sixth aspect includes: a tongue main body that has an insertion portion, which is configured to be inserted into a buckle of a seatbelt device, and an insert-through portion through which a webbing is inserted; an assembled member that is assembled to the tongue main body; a holding portion that is provided at one of the tongue main body or the assembled member; and an elastic portion that is provided at another of the tongue main body or the assembled member, wherein: the elastic portion is elastically deformed in a deforming direction by receiving load from an assembly direction side that is a side toward which the elastic portion is moved with respect to the holding portion at a time at which the assembled member is being assembled to the tongue main body, in a state in which the assembled member is assembled to the tongue main body, the elastic deformation of the elastic portion in the deforming direction is cancelled, and the elastic portion is engaged with the holding portion and is held by the holding portion, and a load from a side that is opposite from the assembly direction side, which is received from the holding portion, is applied to the elastic portion such that the elastic portion elastically deforms in a direction that is opposite from the deforming direction.

In accordance with the tongue for a seatbelt device of the sixth aspect, at the time of assembling the assembled member to the tongue main body, when the elastic portion receives load from the assembly direction side from the holding portion, the elastic portion is elastically deformed in the deforming direction. Due to the elastic deformation of the elastic portion in the deforming direction being cancelled and the elastic portion engaging with the holding portion, the elastic portion is held by the holding portion. Due thereto, the assembled member coming apart from the tongue main body can be suppressed.

On the other hand, for example, at a time when the assembled member starts to come apart from the tongue main body, the elastic portion receives load from the opposite assembly direction side from the holding portion. Here, this load from the opposite assembly direction side is applied so as to elastically deform the elastic portion toward the side opposite the deforming direction. Due thereto, elastic deformation of the elastic portion toward the deforming direction side, which is due to the elastic portion receiving load from the opposite assembly direction side from the holding portion, can be suppressed, and the holding of the elastic portion by the holding portion can be maintained. Therefore, the assembled member coming apart from the tongue main body can be suppressed.

A tongue for a seatbelt device of a seventh aspect includes: a tongue main body that has an insertion portion, which is configured to be inserted into a buckle of a seatbelt device, and an insert-through portion through which a webbing is inserted; an assembled member that is assembled to the tongue main body; a holding portion that is provided at one of the tongue main body or the assembled member; and an elastic portion that is provided at another of the tongue main body or the assembled member, wherein the elastic portion is elastically deformed around a first deformation fulcrum by receiving load from an assembly direction side that is a side toward which the elastic portion is moved with respect to the holding portion at a time at which the assembled member is being assembled to the tongue main body, in a state in which the assembled member is assembled to the tongue main body, the elastic deformation of the elastic portion is cancelled, and the elastic portion is engaged with the holding portion and is held by the holding portion, and a load from a side that is opposite from the assembly direction side, that is received from the holding portion, is applied to the elastic portion such that the elastic portion elastically deforms around a second deformation fulcrum that is further toward a side of an imparted position of the load from the side that is opposite from the assembly direction side than the first deformation fulcrum.

In accordance with the tongue for a seatbelt device of the seventh aspect, at the time of assembling the assembled member to the tongue main body, when the elastic portion receives load from the assembly direction side from the holding portion, the elastic portion is elastically deformed around the first deformation fulcrum. Due to this elastic deformation of the elastic portion being cancelled and the elastic portion engaging with the holding portion, the elastic portion is held by the holding portion. Due thereto, the assembled member coming apart from the tongue main body can be suppressed.

On the other hand, for example, at a time when the assembled member starts to come apart from the tongue main body, the elastic portion receives load from the opposite assembly direction side from the holding portion. Here, the second deformation fulcrum, which is the deformation fulcrum of the elastic portion at the time when such load from the opposite assembly direction side is imparted to the elastic portion, is further toward the imparted position side of the load from the opposite assembly direction side at the elastic portion, than the first deformation fulcrum. Therefore, in a case in which the elastic portion receives load from the opposite assembly direction side from the holding portion, it is more difficult for the elastic portion to elastically deform than in a case in which the elastic portion receives load from the assembly direction side from the holding portion. Due thereto, elastic deformation of the elastic portion, which is due to the elastic portion receiving load from the opposite assembly direction side from the holding portion, can be suppressed, and the holding of the elastic portion by the holding portion can be maintained. Therefore, the assembled member coming apart from the tongue main body can be suppressed.

In a tongue for a seatbelt device of an eighth aspect, in the tongue for a seatbelt device of the sixth or the seventh aspect, an abutment portion of the holding portion, which abuts the elastic portion at a time at which the holding portion imparts the load from the side that is opposite from the assembly direction side to the elastic portion, is inclined, with respect to an assembly direction, toward an elastically deforming direction side of the elastic portion at the time at which the assembled member is being assembled to the tongue main body.

In accordance with the tongue for a seatbelt device of the eighth aspect, the abutment portion of the holding portion, which abuts the elastic portion at the time when the holding portion imparts load from the opposite assembly direction side to the elastic portion, is inclined, with respect to the assembly direction, toward the elastically deforming direction side of the elastic portion at the time when the assembled member is being assembled to the tongue main body. Even if the elastic portion slides with respect to the holding portion due to reaction force at the time when the holding portion imparts load from the opposite assembly direction side to the elastic portion, it is difficult for elastic deformation of the elastic portion, which is toward the same direction side as the elastic deformation of the elastic portion at the time when the assembled member is being assembled to the tongue main body, to arise. Due thereto, the holding of the elastic portion by the holding portion can be maintained. Therefore, the assembled member coming apart from the tongue main body can be suppressed.

In a tongue for a seatbelt device of a ninth aspect, in the tongue for a seatbelt device of any one of the sixth through eighth aspects, the abutment portion of the holding portion, which abuts the elastic portion at the time at which the holding portion imparts the load from the side that is opposite from the assembly direction side to the elastic portion, is a flat surface.

In accordance with the tongue for a seatbelt device of the ninth aspect, the abutment portion of the holding portion, which abuts the elastic portion at the time when the holding portion imparts load from the opposite assembly direction side to the elastic portion, is a flat surface. Therefore, even if the elastic portion slides with respect to the holding portion due to reaction force at the time when the holding portion imparts load from the opposite assembly direction side to the elastic portion, the change in the direction of the load of the opposite assembly direction side that is imparted to the elastic portion from the holding portion, and the change in the direction of the reaction force thereof, can be made to be small.

In a tongue for a seatbelt device of a tenth aspect, the tongue for a seatbelt device of any one of the sixth through ninth aspects further includes: a clamp member that is provided at the tongue main body so as to be movable with respect to the tongue main body, and that, by being moved, nips the webbing between the tongue main body and the clamp member; and a supporting member that is provided at the tongue main body and supports the clamp member, wherein the assembled member suppresses movement of the supporting member with respect to the tongue main body.

In accordance with the tongue for a seatbelt device of the fifth aspect, the assembled member coming apart from the tongue main body can be suppressed. Therefore, suppression of movement of the supporting member by the assembled member can be maintained, and the supporting member moving with respect to the tongue main body can be maintained.

As described above, in the tongue for a seatbelt device relating to the present disclosure, holding of an elastic portion by a holding portion can be maintained.

BRIEF DESCRIPTION OF THE DRAWINGS

An exemplary embodiment will be described in detail with reference to the following figures, wherein:

FIG. 4A shows a state in which a first elastic piece and a second elastic piece abut a holding portion from an opposite assembly direction side, and FIG. 4B shows a state in which the first elastic piece and the second elastic piece abut the holding portion from the assembly direction side;

FIG. 9A shows a state in which the first elastic piece and the second elastic piece abut the holding portion from an opposite assembly direction side, and FIG. 9B shows a state in which the first elastic piece and the second elastic piece abut the holding portion from the assembly direction side.

DETAILED DESCRIPTION

An exemplary embodiment of the present disclosure is described next on the basis of the respective drawings from FIG. 1 to FIGS. 9A and 9B. Note that, in the respective drawings, arrow FR indicates the front side of a vehicle to which a present seatbelt device 12 is applied, arrow OUT indicates the vehicle transverse (width) direction outer side, arrow IN indicates the vehicle transverse (width) direction inner side, and arrow UP indicates the vehicle upper side. Moreover, arrow As indicates the assembling direction of assembling a cover (cap) 88, which serves as an assembled member, to a tongue main body 40 that serves as a member to be assembled to. Arrow W1 indicates a transverse (width) direction one side of the cover 88, and arrow W2 indicates a transverse (width) direction another side of the cover 88.

<Structure of Present Exemplary Embodiment>

Figure 1:
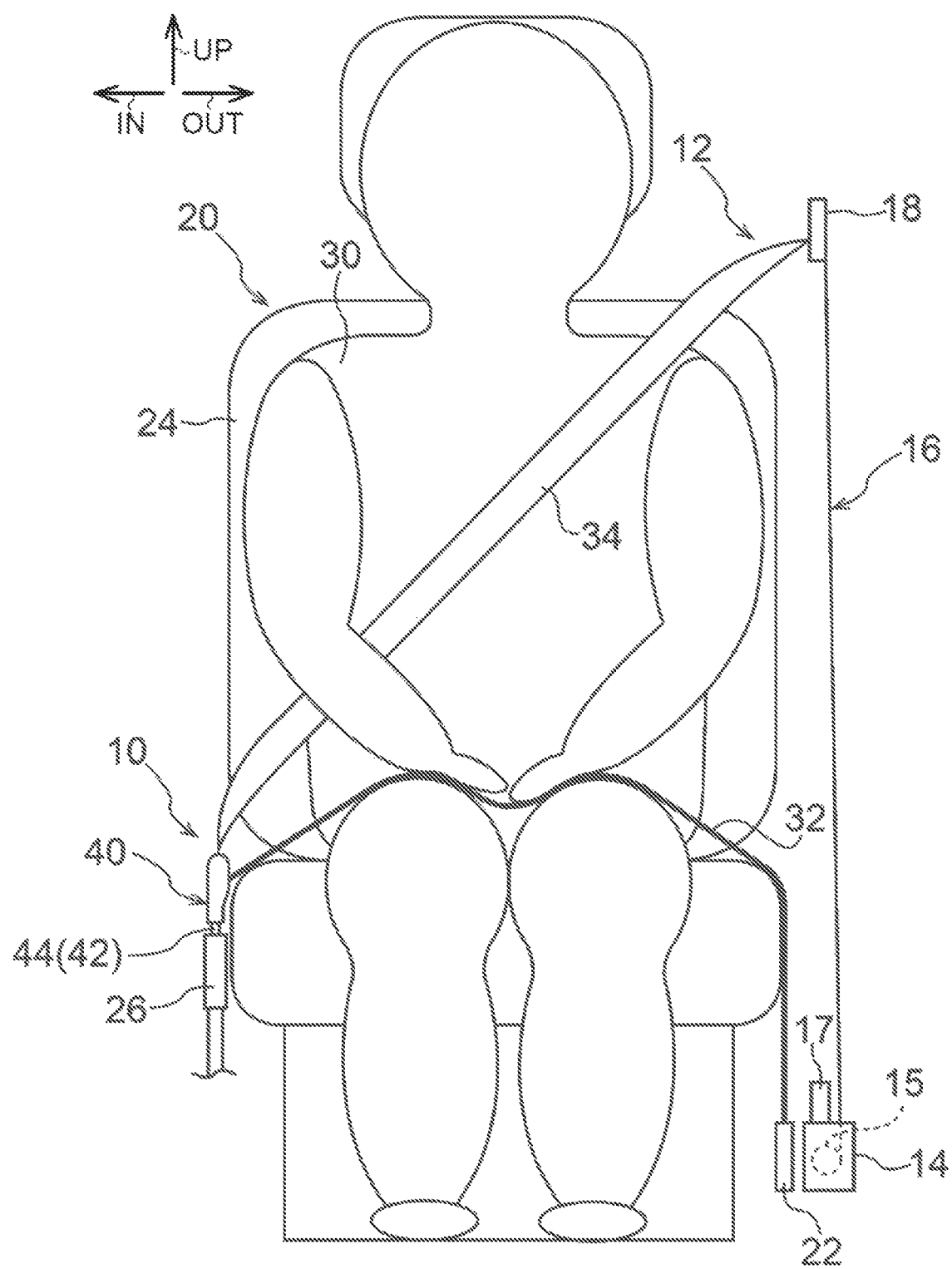
FIG. 1 is a front view in which a seatbelt device, to which a tongue for a seatbelt device relating to an embodiment of the present disclosure is applied, is seen from a vehicle front side.

As shown in FIG. 1, the seatbelt device 12, to which is applied a tongue 10 for a seatbelt device (hereinafter simply called "tongue 10") relating to an exemplary embodiment of the present disclosure, has a webbing take-up device 14 that serves as a webbing accommodating portion. The webbing take-up device 14 has a spool 15. The length direction proximal (base) end portion of a webbing 16 is anchored on the spool 15. Further, the webbing take-up device 14 has a pretensioner 17. The pretensioner 17 is operated at the time of an emergency of the vehicle such as at the time of a collision of the vehicle or the like, and the spool 15 is rotated in a take-up direction due to the pretensioner 17 being operated. Due thereto, the webbing 16 is taken-up onto the spool 15. Moreover, the webbing take-up device 14 has a locking mechanism (not shown in the drawings). The locking mechanism is operated at the time of an emergency of the vehicle such as at the time of a collision of the vehicle or the like. Due to the locking mechanism being operated, rotation of the spool 15 in a pull-out direction is limited, and pulling-out of the webbing 16 from the spool 15 is limited.

On the other hand, the length direction distal end side of the webbing 16 is passed-through a slit hole of a shoulder anchor 18 that is mounted to a vicinity of the vehicle upper side end portion of a center pillar, and is folded-back toward the vehicle lower side. The length direction distal end portion of the webbing 16 that has been folded-back toward the vehicle lower side is anchored on an anchor 22. The anchor 22 is disposed at the vehicle transverse direction outer side of a seat 20 for the vehicle, and the anchor 22 is fixed to the vehicle body. The tongue 10 relating to the present exemplary embodiment is provided between the length direction distal end of the webbing 16 (the portion that is anchored on the anchor 22) and the shoulder anchor 18.

Further, a buckle 26 is provided at the vehicle transverse direction inner side of the seat 20. Due to the tongue 10 being held by the buckle 26 in the state in which the webbing 16 has been trained around the body of a vehicle occupant 30, there is a state in which the webbing 16 is applied to the body of the vehicle occupant 30. In this state, the portion, which is between the tongue 10 and the anchor 22, of the webbing 16 is a lap webbing 32. The waist portion of the vehicle occupant 30 is restrained by the lap webbing 32. In contrast, the portion, which is between the shoulder anchor 18 and the tongue 10, of the webbing 16 is a shoulder webbing 34. The shoulder portion and the chest region and the like of the vehicle occupant 30 are restrained by the shoulder webbing 34.

<Structure of Tongue 10>

The structure of the tongue 10 is described next.

Figure 2:
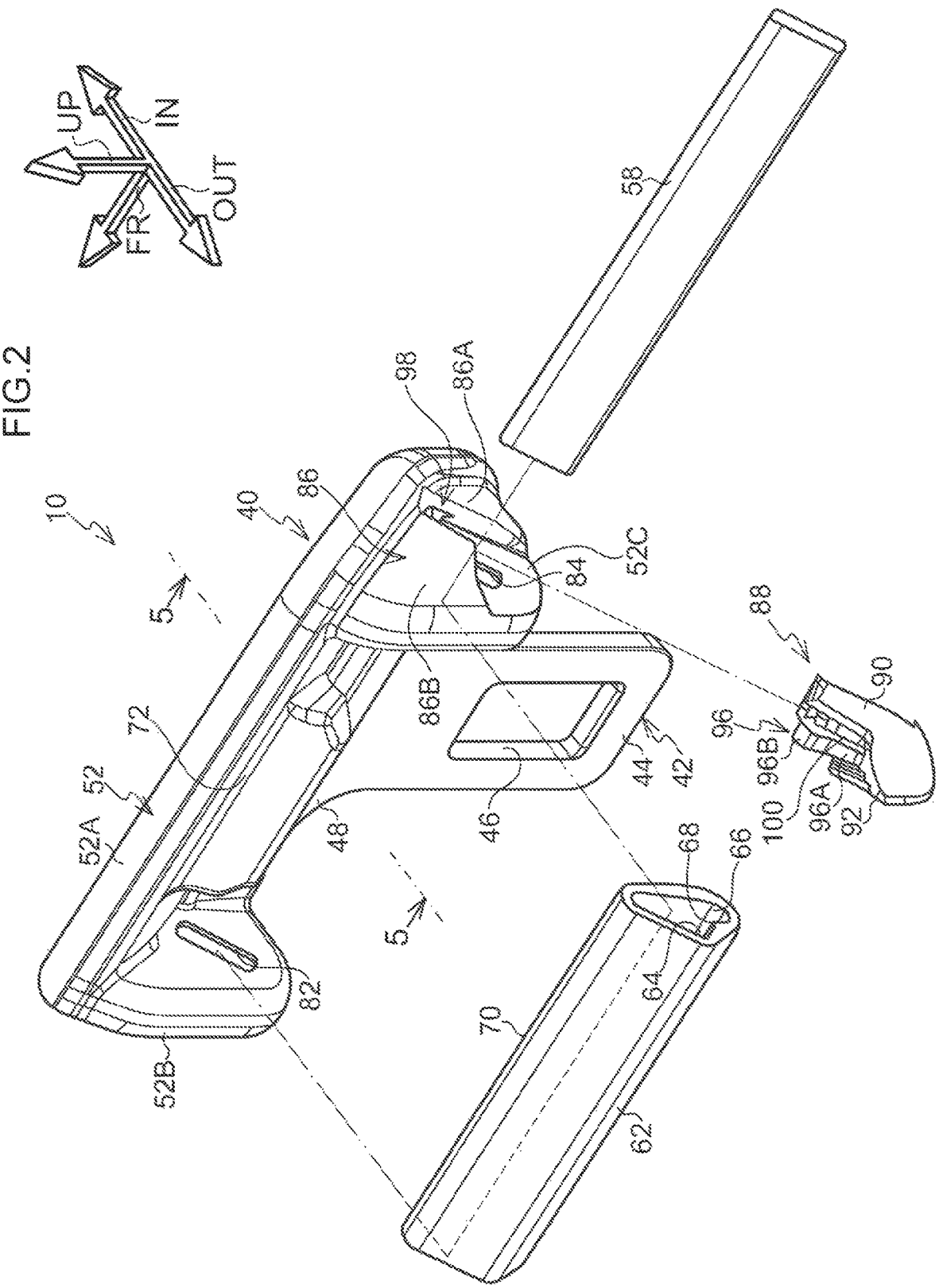
FIG. 2 is an exploded perspective view of the tongue for a seatbelt device relating to the embodiment of the present disclosure.
Figure 5:
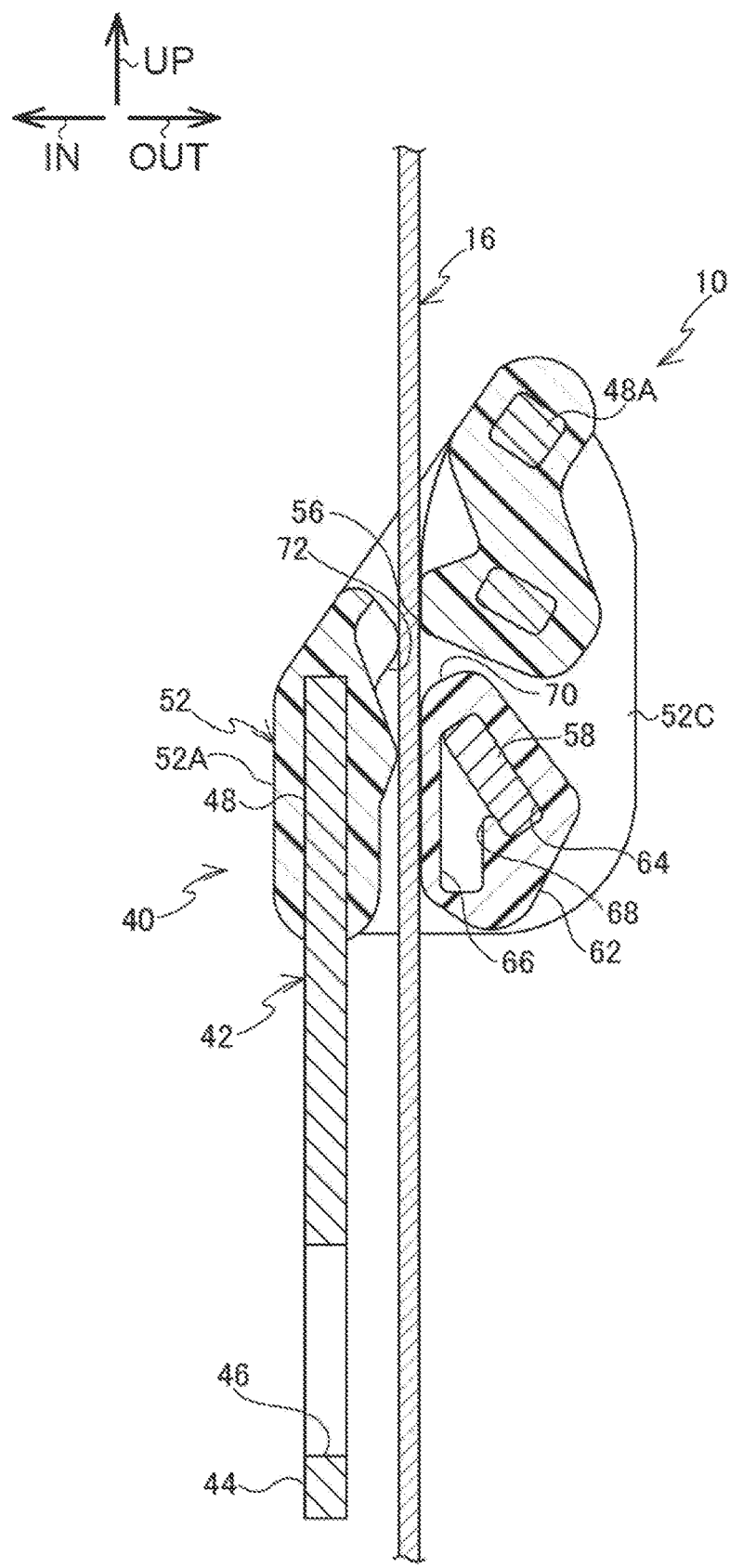
FIG. 5 is a cross-sectional view of the tongue along line 5-5 of FIG. 2, and is a drawing showing a state before an insertion portion of a metal core of the tongue is inserted into a buckle.

As shown in FIG. 2 and FIG. 5, the tongue 10 has the tongue main body 40, and the tongue main body 40 has a metal core 42. The metal core 42 is formed by punching-out a metal flat plate that is made of iron or stainless steel or the like for example, and bending the metal flat plate. The metal core 42 has an insertion portion 44. When the tongue 10 is to be held at the buckle 26 (see FIG. 1 and FIG. 6), the insertion portion 44 is inserted into the buckle 26 from an opening portion that is formed in the buckle 26. A through-hole 46 is formed in the insertion portion 44. When the insertion portion 44 is inserted in the buckle 26, a latch that is provided at the buckle 26 enters into the through-hole 46. Due thereto, movement of the insertion portion 44 in the direction of coming-out from the buckle 26 (toward the vehicle upper side in FIG. 6 and the like) is limited, and, due thereto, the tongue 10 is held at the buckle 26.

As shown in FIG. 2 and FIG. 5, the metal core 42 has a base portion 48. The base portion 48 is the portion that is further toward the vehicle upper side than the insertion portion 44 (the portion of the metal core 42 that is at the side opposite the direction of insertion of the insertion portion 44 into the buckle 26). As shown in FIG. 5, a vehicle upper side portion 48A, which is further toward the vehicle upper side than the vehicle vertical direction (vehicle upper and lower direction) intermediate portion of the base portion 48, is bent toward the vehicle transverse direction outer side. A covering portion 52 is provided at the base portion 48. The covering portion 52 is formed of a synthetic resin material, and the base portion 48 is covered by the covering portion 52.

Moreover, the covering portion 52 has a covering portion main body 52A. The covering portion main body 52A has an insert-through hole 56 that serves as an insert-through portion. A hole, which passes-through in the thickness direction of the vehicle upper side portion 48A of the base portion 48, is formed in the portion, which corresponds to the insert-through hole 56 of the covering portion 52, at the vehicle upper side portion 48A of the base portion 48 of the metal core 42. The insert-through hole 56 of the covering portion 52 is formed by the inner side portion of this hole of the base portion 48 being covered by the covering portion 52.

The insert-through hole 56 passes-through in the vehicle vertical direction, and the dimension thereof in the vehicle front and rear direction (the far side and the near side of the drawing of FIG. 5, and the arrow FR direction and the direction opposite thereto in FIG. 2) is greater than or equal to the width dimension of the webbing 16. The webbing 16 passes-through the inner side of the insert-through hole 56. Due thereto, the tongue 10 can move in the length direction of the webbing 16 along the webbing 16.

Further, as shown in FIG. 2, the covering portion 52 has a first supporting portion 52B and a second supporting portion 52C. The first supporting portion 52B is provided at the vehicle transverse direction outer side of the vehicle front side end of the covering portion main body 52A. The metal core 42 has a first leg piece (not shown in the drawings) in correspondence with the first supporting portion 52B. The first leg piece is formed by the vehicle front side portion of the base portion 48 of the metal core 42 being bent toward the vehicle transverse direction outer side. The first supporting portion 52B is formed due to the first leg piece being covered by the synthetic resin material that forms the covering portion 52.

On the other hand, the second supporting portion 52C is provided at the vehicle transverse direction outer side of the vehicle rear side end of the covering portion main body 52A. The metal core 42 has a second leg piece (not shown in the drawings) in correspondence with the second supporting portion 52C. The second leg piece is formed by the vehicle rear side portion of the base portion 48 of the metal core 42 being bent toward the vehicle transverse direction outer side. The second supporting portion 52C is formed due to the second leg piece being covered by the synthetic resin material that forms the covering portion 52.

A guide bar 58 serving as a guiding portion is provided at the tongue main body 40. The guide bar 58 is disposed further toward the vehicle lower side than the insert-through hole 56 of the covering portion 52 and further toward the vehicle transverse direction outer side than the insert-through hole 56. The guide bar 58 is formed of a metal such as iron, stainless steel or the like for example. The guide bar 58 is shaped as a flat plate. The shape, when viewing the guide bar 58 in the thickness direction, is rectangular. The length direction of the guide bar 58 is generally the vehicle front and rear direction (the far side and the near side of the drawing of FIG. 5, and the arrow FR direction and the direction opposite thereto in FIG. 2).

Further, the cross-sectional shape when the guide bar 58 is cut in a direction orthogonal to the length direction is rectangular. The transverse direction of the guide bar 58 is inclined in the vehicle vertical direction with respect to the vehicle transverse direction. A transverse direction one side (vehicle transverse direction inner side) end of the guide bar 58 is disposed further toward the vehicle upper side than a transverse direction another side (vehicle transverse direction outer side) end of the guide bar 58.

A first supporting hole 82 is formed in the first supporting portion 52B of the above-described covering portion 52. The first supporting hole 82 is a hole having a bottom and that is open at the vehicle rear side surface of the first supporting portion 52B. The shape of the opening of the first supporting hole 82 is a rectangular shape that is substantially the same as the vehicle front side end of the guide bar 58. In the state in which the guide bar 58 is assembled to the tongue main body 40, the vehicle front side end portion of the guide bar 58 is inserted in the first supporting hole 82. Due thereto, the vehicle front side end portion of the guide bar 58 is supported by the first supporting portion 52B of the covering portion 52.

On the other hand, a second supporting hole 84 is formed in the second supporting portion 52C of the covering portion 52. The second supporting hole 84 is a through-hole that passes-through the second supporting portion 52C in the vehicle front and rear direction. The shape of the opening of the second supporting hole 84 is a rectangular shape that is substantially the same as the vehicle rear side end of the guide bar 58. In the state in which the guide bar 58 is assembled to the tongue main body 40, the vehicle rear side end portion of the guide bar 58 is disposed at the inner side of the second supporting hole 84. Due thereto, the vehicle rear side end portion of the guide bar 58 is supported by the second supporting portion 52C of the covering portion 52.

Figure 6:
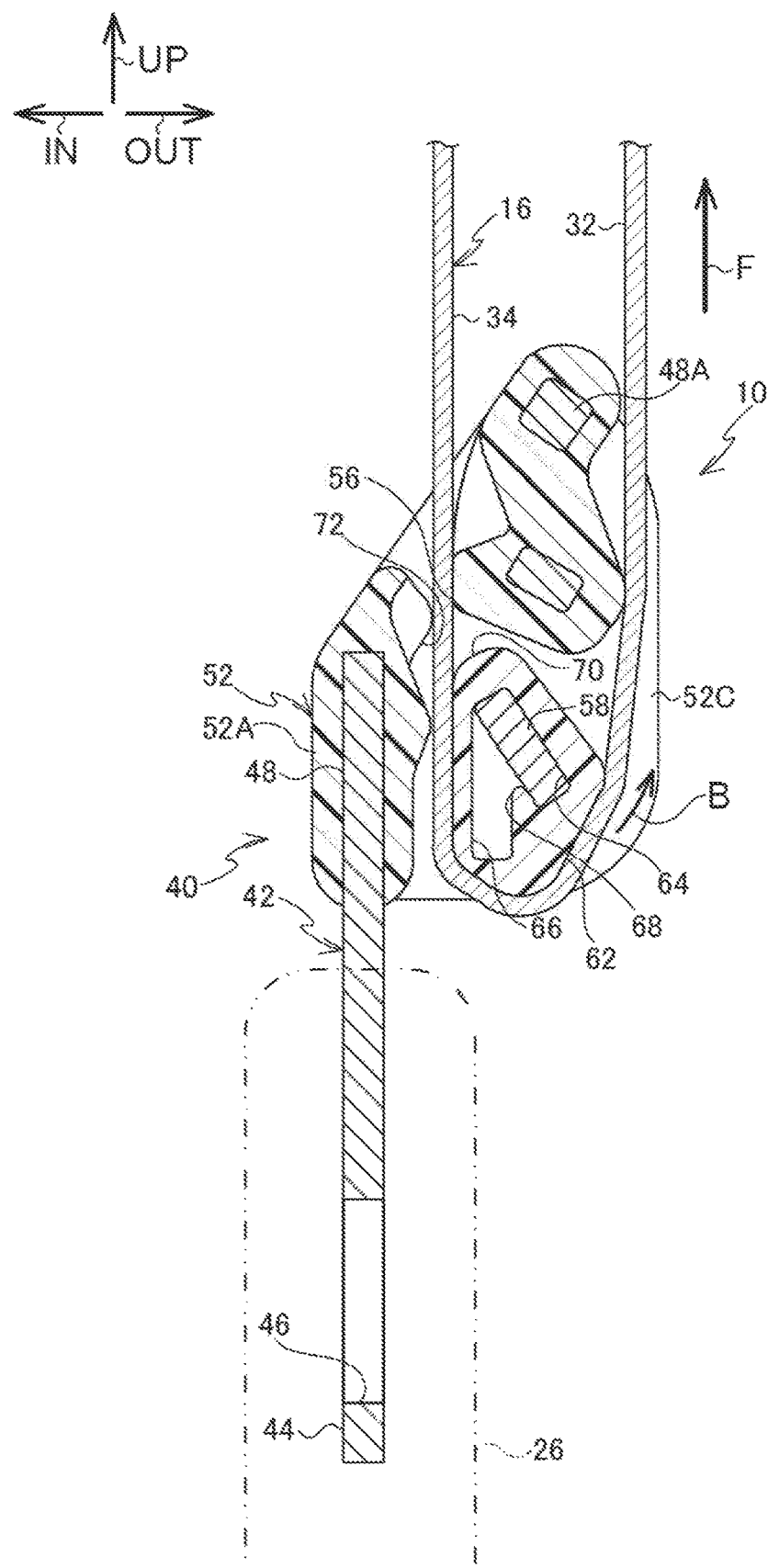
FIG. 6 is a cross-sectional view of the tongue along line 5-5 of FIG. 2, and is a drawing showing a state in which the insertion portion of the metal core of the tongue has been inserted into the buckle.
Figure 7:
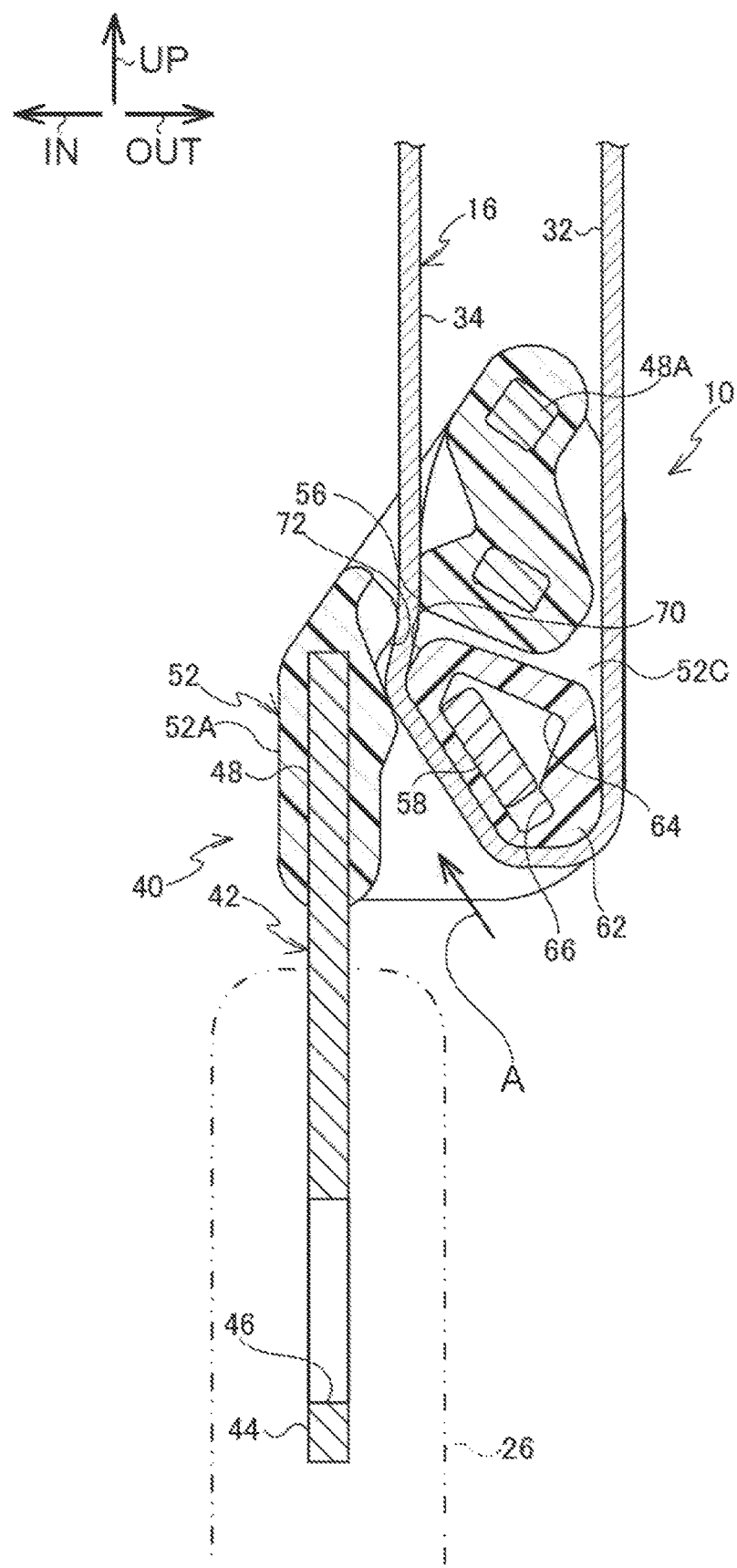
FIG. 7 is a cross-sectional view of the tongue along line 5-5 of FIG. 2, and is a drawing showing a state in which a clamp member has been rotated toward a clamp rotation direction side.

A clamp member 62 is provided at the guide bar 58. A supporting hole 64 is formed in the clamp member 62. The supporting hole 64 passes-through the clamp member 62 in the vehicle front and rear direction. As shown in FIG. 5 and FIG. 6, in the initial state of the tongue 10, the guide bar 58 is disposed at the inner side of the supporting hole 64. Further, as shown in FIG. 5, a guide hole 66 is formed in the clamp member 62. As shown in FIG. 7, in the state in which the guide bar 58 is disposed at the inner side of the guide hole 66, the clamp member 62 can be displaced toward the transverse direction one side of the guide bar 58 (the arrow A direction side in FIG. 7).

Further, as shown in FIG. 5, the vehicle lower side portion of the supporting hole 64 at the clamp member 62 is a limiting rib 68 that serves as a limiting portion. In the state in which the guide bar 58 is disposed within the supporting hole 64, the limiting rib 68 is provided further toward a transverse direction one side of the clamp member 62 (the vehicle transverse direction inner side) than the transverse direction another side (the vehicle transverse direction outer side) end portion of the guide bar 58. The limiting rib 68 abuts the vehicle lower side surface of the clamp member 62. Due to the limiting rib 68 being broken by the clamp member 62, the clamp member 62 can rotate in a clamp rotation direction (the arrow B direction in FIG. 6).

Figure 8:
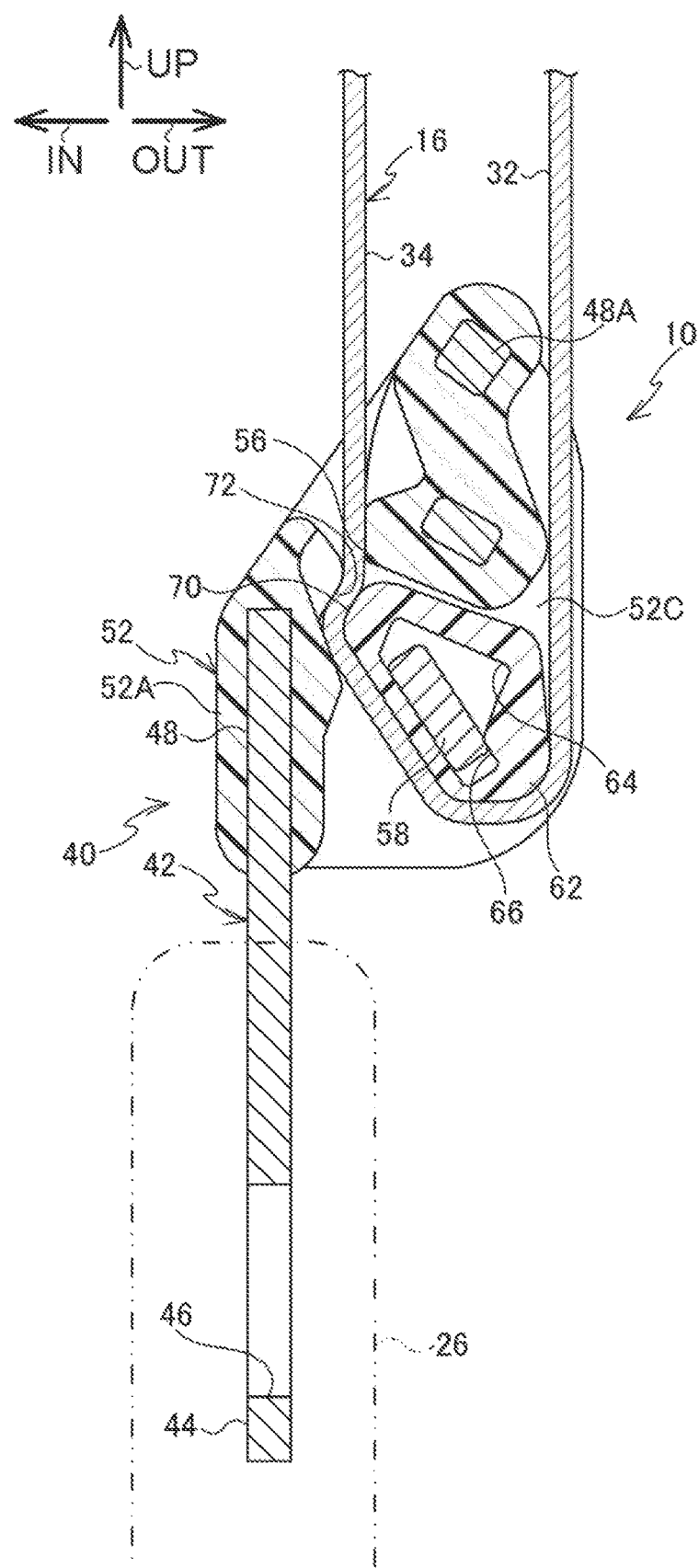
FIG. 8 is a cross-sectional view of the tongue along line 5-5 of FIG. 2, and is a drawing showing a state in which a webbing is nipped between a pressing portion of the clamp member and an opposing portion of a tongue main body.

On the other hand, the clamp member 62 has a pressing portion 70. The pressing portion 70 is, of the outer peripheral portion of the clamp member 62, the portion at the vehicle upper side of the vehicle transverse direction inner side portion. Further, a clamp portion 72 is provided at the covering portion 52 of the tongue main body 40. In the state in which the guide bar 58 is disposed within the guide hole 66, the clamp portion 72 is the portion that faces the pressing portion 70 in the transverse direction of the guide bar 58. The clamp portion 72 is provided at the vehicle lower side of the insert-through hole 56 that is provided in the covering portion 52. As shown in FIG. 8, the webbing 16 is held by being nipped by the pressing portion 70 of the clamp member 62 and the clamp portion 72. In this state, movement of the shoulder webbing 34 side portion of the webbing 16 toward the lap webbing 32 side can be limited.

On the other hand, as shown in FIG. 2, a cover attachment portion 86 is provided at the second supporting portion 52C of the above-described covering portion 52. The cover attachment portion 86 has a transverse direction one side portion 86A and a transverse direction another side portion 86B. The transverse direction one side portion 86A and the transverse direction another side portion 86B are provided such that an interval therebetween is provided in a direction that is inclined toward the vehicle vertical direction with respect to the vehicle transverse direction, i.e., the interval therebetween is provided in the transverse (width) direction of the cover 88 that is described later (the arrow W1 direction and the arrow W2 direction in FIGS. 4A and 4B). Further, the cover 88 that serves as an assembled member is provided at the cover attachment portion 86. The assembly direction (the arrow As direction in FIGS. 4A and 4B and the like) of the cover 88 is a direction which is inclined toward the vehicle transverse direction inner side with respect to the vehicle upper side, and the cover 88 is assembled to the cover attachment portion 86 from an opposite assembly direction side that is opposite the assembly direction side (the arrow As direction side in FIGS. 4A and 4B and the like). The assembly direction side portion of the cover 88 in the state in which the cover 88 is assembled to the cover attachment portion 86 is disposed between the transverse direction one side portion 86A and the transverse direction another side portion 86B of the cover attachment portion 86.

The cover 88 has a design portion 90. In the state in which the cover 88 is assembled to the cover attachment portion 86, the vehicle rear side surface and the opposite assembly direction side surface of the design surface 90 are exposed toward the outer side of the tongue main body 40 of the cover attachment portion 86 as portions of the design surface of the tongue 10. An opposing portion 92 is provided at the vehicle front side of the design portion 90. The vehicle rear side end of the opposing portion 92 is connected to the vehicle front side end of the design portion 90, and the opposing portion 92 is made integral with the design portion 90. Further, in the state in which the cover 88 is assembled to the cover attachment portion 86, the opposing portion 92 opposes the vehicle rear side surface of the second supporting portion 52C, at the vehicle rear side of the second supporting portion 52C of the covering portion 52. Further, a portion at the vehicle transverse direction central side of the opposing portion 92 faces the opposite assembly direction side portion at the second supporting hole 84 of the second supporting portion 52C.

Figure 4A:
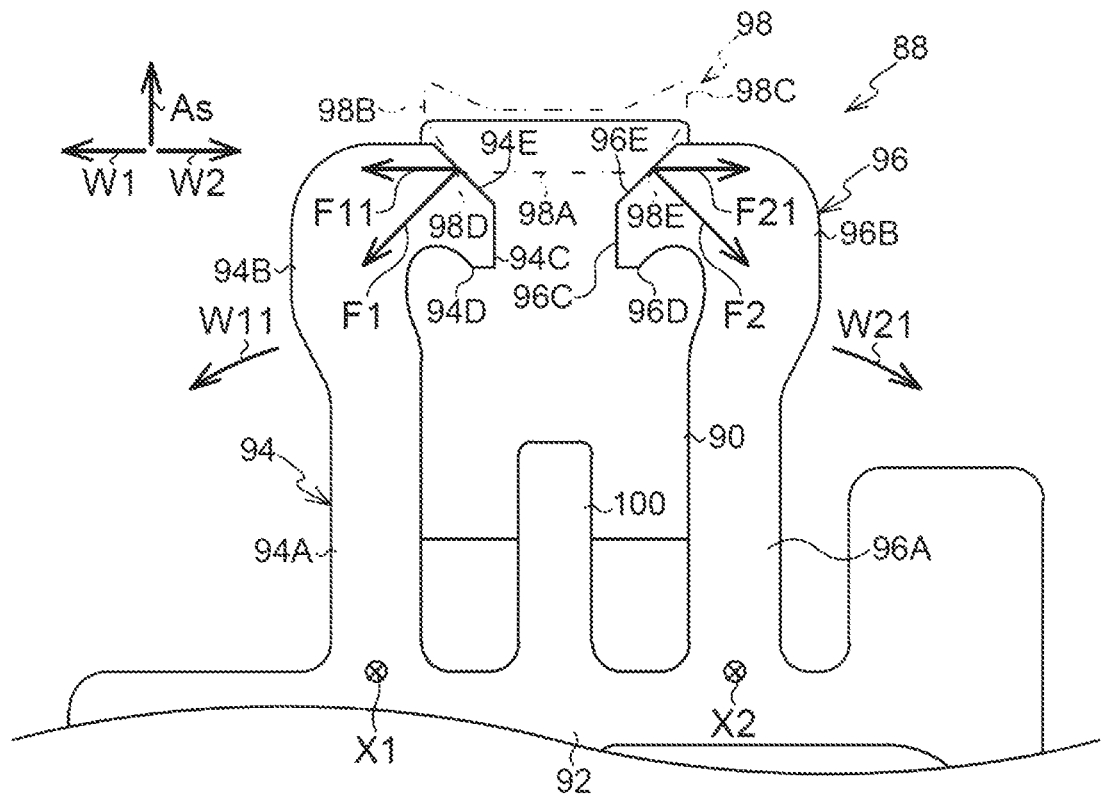
FIGS. 4A and 4B are front views in which an assembly direction side portion of the cover is seen from the vehicle front side.
Figure 4B:
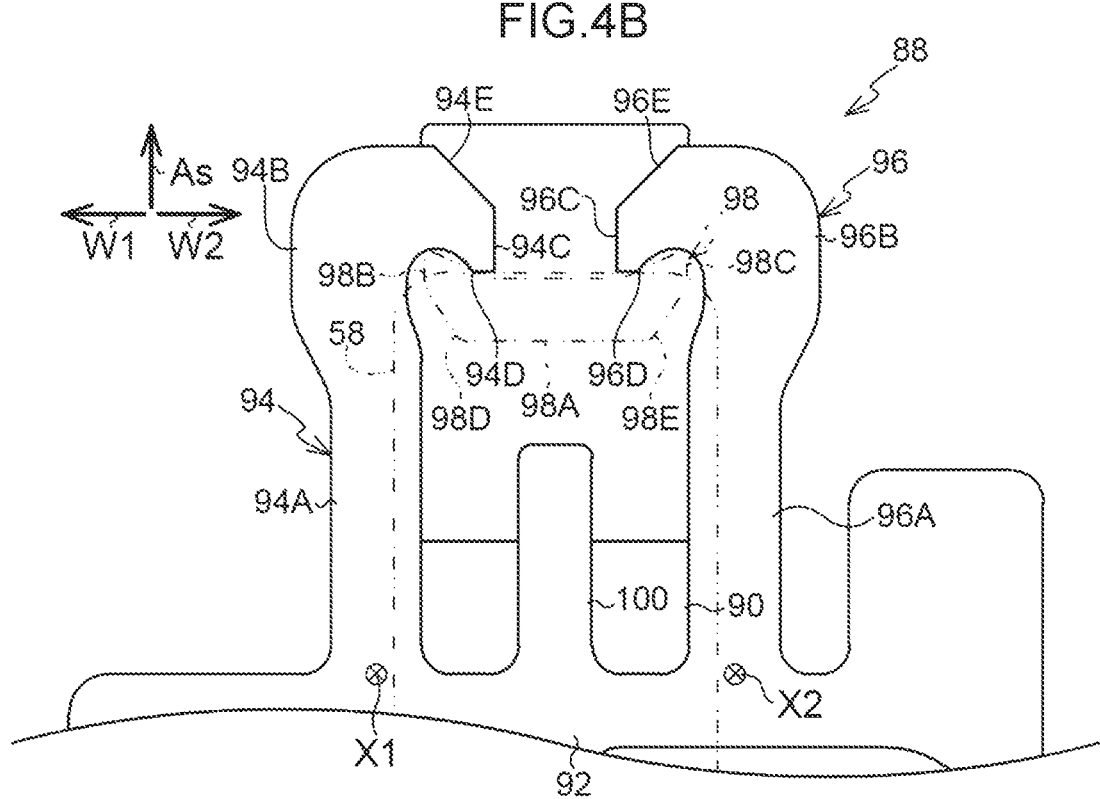

A first elastic piece 94 (an elastic member) and a second elastic piece 96 (an elastic member), which respectively serve as an elastic portion, are provided at the assembly direction side of the opposing portion 92. The first elastic piece 94 and the second elastic piece 96 are disposed so as to be apart from the design portion 90 at the vehicle front side of the design portion 90. As shown in FIGS. 4A and 4B, the first elastic piece 94 has a first base portion 94A. The first base portion 94A is formed in the shape of a rod, and the length direction of the first base portion 94A runs along the assembly direction. The length direction proximal (base) end of the first base portion 94A is connected to the assembly direction side end of the opposing portion 92, and the first elastic piece 94 extends toward the assembly direction side from the assembly direction side end of the opposing portion 92. A first hook portion 94B is provided at the length direction distal end side of the first base portion 94A.

Figure 3:
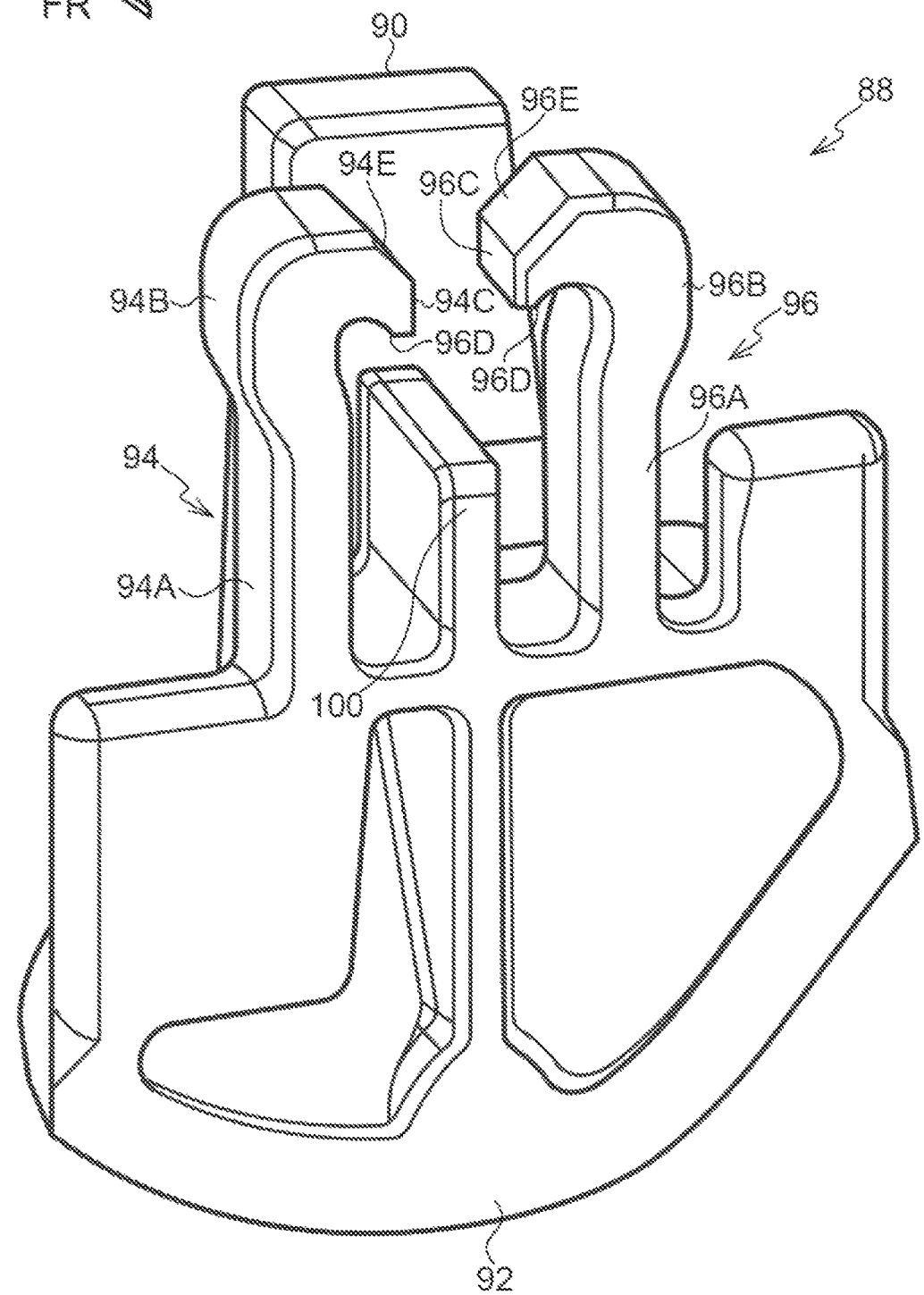
FIG. 3 is a perspective view of a cover.

The first hook portion 94B is formed in a substantial C-shape, and opens in a direction that is inclined toward the opposite assembly direction side with respect to the cover 88 transverse (width) direction another side (the arrow W2 direction side in FIG. 3 and the like). The length direction proximal (base) end of the first hook portion 94B is connected to the length direction distal end of the first base portion 94A. The length direction intermediate portion of the first hook portion 94B is offset further toward the cover 88 transverse direction one side (the arrow W1 direction side in FIG. 3 and the like) than the first base portion 94A. Moreover, the length direction intermediate portion of the first hook portion 94B is, at the length direction distal end side, bent toward the cover 88 transverse direction another side. The length direction distal end portion of the first hook portion 94B is disposed further toward the cover 88 transverse direction another side than the first base portion 94A. Moreover, the length direction distal end of the first hook portion 94B is a first claw 94C. The length direction distal end surface of the first hook portion 94B at the first claw 94C is a flat surface that is substantially parallel to the transverse direction of the cover 88 (the arrow W1 direction and the arrow W2 direction in FIG. 3 and the like).

In contrast, the second elastic piece 96 is provided at the cover 88 transverse direction another side with respect to the first elastic piece 94. The second elastic piece 96 has a second base portion 96A. The second base portion 96A is formed in the shape of a rod, and the length direction of the second base portion 96A runs along the assembly direction. The length direction proximal (base) end of the second base portion 96A is connected to the assembly direction side end of the opposing portion 92, and the second elastic piece 96 extends toward the assembly direction side from the assembly direction side end of the opposing portion 92. A second hook portion 96B is provided at the length direction distal end side of the second base portion 96A.

The second hook portion 96B is formed in a substantial C-shape (to describe further, a substantial backward C-shape in which the left and right of the letter C are reversed), and opens in a direction that is inclined toward the opposite assembly direction side with respect to the cover 88 transverse direction one side (the arrow W1 direction side in FIG. 3 and the like). The length direction proximal (base) end of the second hook portion 96B is connected to the length direction distal end of the second base portion 96A. The length direction intermediate portion of the second hook portion 96B is offset further toward the cover 88 transverse direction another side (the arrow W2 direction side in FIG. 3 and the like) than the second base portion 96A. Moreover, the length direction intermediate portion of the second hook portion 96B is, at the length direction distal end side, bent toward the cover 88 transverse direction one side. The length direction distal end portion of the second hook portion 96B is disposed further toward the cover 88 transverse direction one side than the second base portion 96A. Moreover, the length direction distal end of the second hook portion 96B is a second claw 96C. The length direction distal end surface of the second hook portion 96B at the second claw 96C is a flat surface that is substantially parallel to the transverse direction of the cover 88 (the arrow W1 direction and the arrow W2 direction in FIGS. 4A and 4B and the like).

A holding portion 98 is provided (see FIG. 3) between the transverse direction one side portion 86A and the transverse direction another side portion 86B of the cover attachment portion 86 of the tongue main body 40, so as to correspond to the first elastic piece 94 and the second elastic piece 96. The holding portion 98 is formed so as to project-out toward the vehicle rear side from the vehicle rear side surface of the second supporting portion 52C of the covering portion 52. As shown in FIGS. 4A and 4B, the holding portion 98 has a holding portion main body 98A. The holding portion main body 98A is substantially rectangular parallelepiped. The length direction of the holding portion main body 98A runs along the transverse (width) direction of the cover 88 (the arrow W1 direction and the arrow W2 direction in FIGS. 4A and 4B and the like), and the transverse (width) direction of the holding portion main body 98A runs along the assembly direction (the arrow As direction in FIGS. 4A and 4B and the like).

A first engaging portion 98B is provided at the cover 88 transverse direction one side of the holding portion main body 98A. The assembly direction side surface of the first engaging portion 98B is disposed further toward the assembly direction side than the assembly direction side surface of the holding portion main body 98A, and is a flat surface that is inclined toward the cover 88 transverse direction one side with respect to the assembly direction. In contrast, the opposite assembly direction side surface of the first engaging portion 98B is disposed further toward the assembly direction side than the opposite assembly direction side surface of the holding portion main body 98A, and is a flat surface that is inclined toward the cover 88 transverse direction another side with respect to the opposite assembly direction (the direction opposite arrow As in FIGS. 4A and 4B and the like). The cover 88 transverse direction another side end of the first engaging portion 98B is connected to the cover 88 transverse direction one side end of the holding portion main body 98A.

Further, a second engaging portion 98C is provided at the cover 88 transverse direction another side of the holding portion main body 98A. The assembly direction side surface of the second engaging portion 98C is disposed further toward the assembly direction side than the assembly direction side surface of the holding portion main body 98A, and is a flat surface that is inclined toward the cover 88 transverse direction another side with respect to the assembly direction. In contrast, the opposite assembly direction side surface of the second engaging portion 98C is disposed further toward the assembly direction side than the opposite assembly direction side surface of the holding portion main body 98A, and is a flat surface that is inclined toward the cover 88 transverse direction one side with respect to the opposite assembly direction. The cover 88 transverse direction one side end of the second engaging portion 98C is connected to the cover 88 transverse direction another side end of the holding portion main body 98A.

At the time of assembling the cover 88 to the cover attachment portion 86 of the tongue main body 40 (before the state in which the assembling is completed), the holding portion 98 is disposed at the assembly direction side between the first elastic piece 94 and the second elastic piece 96. In this state, a first inclined surface portion 94E of the first elastic piece 94 is disposed at the opposite assembly direction side of a first corner portion 98D that is at the boundary between the holding portion main body 98A and the first engaging portion 98B at the opposite assembly direction side surface of the holding portion 98. The first inclined surface portion 94E is a flat surface that is inclined toward the cover 88 transverse direction one side with respect to the assembly direction. At the time of assembling the cover 88 to the cover attachment portion 86, the first inclined surface portion 94E is made to linearly contact the first corner portion 98D of the holding portion 98 (FIG. 4A).

On the other hand, in the state in which the holding portion 98 is disposed at the assembly direction side between the first elastic piece 94 and the second elastic piece 96, a second inclined surface portion 96E of the second elastic piece 96 is disposed at the opposite assembly direction side of a second corner portion 98E that is at the boundary between the holding portion main body 98A and the second engaging portion 98C at the opposite assembly direction side surface of the holding portion 98. The second inclined surface portion 96E is a flat surface that is inclined toward the cover 88 transverse direction another side with respect to the assembly direction. At the time of assembling the cover 88 to the cover attachment portion 86, the second inclined surface portion 96E is made to linearly contact the second corner portion 98E of the holding portion 98 (FIG. 4A).

Further, as shown in FIG. 4B, in the state in which the cover 88 is assembled to the cover attachment portion 86 of the tongue main body 40 (in the state in which the assembling is completed), the holding portion main body 98A of the holding portion 98 is disposed further toward the opposite assembly direction side than the first claw 94C of the first elastic piece 94 and the second claw 96C of the second elastic piece 96. In this state, a first claw corner portion 94D at the cover 88 transverse direction one side of the first claw 94C faces, along the assembly direction, the assembly direction side surface of the first engaging portion 98B of the holding portion 98, and the first claw corner portion 94D of the cover 88 and assembly direction side surface of the first engaging portion 98B of the holding portion 98 linearly contact one another.

On the other hand, in the state in which the cover 88 is assembled to the cover attachment portion 86 (in the state in which the assembling is completed), a second claw corner portion 96D at the cover 88 transverse direction another side of the second claw 96C of the second elastic piece 96 faces, along the assembly direction, the assembly direction side surface of the second engaging portion 98C of the holding portion 98. The second claw corner portion 96D of the cover 88 and the assembly direction side surface of the second engaging portion 98C of the holding portion 98 linearly contact one another.

On the other hand, a vertical rib 100 that serves as a load receiving portion is provided at the cover 88. The vertical rib 100 is shaped as a substantial rectangular parallelepiped that is long in the assembly direction, and is disposed at the substantial center between the first elastic piece 94 and the second elastic piece 96 of the cover 88. The opposite assembly direction side end of the vertical rib 100 is connected to the assembly direction side end of the opposing portion 92 of the cover 88, and the vehicle rear side end of the vertical rib 100 is connected to the vehicle front side end of the design portion 90 of the cover 88, and the vertical rib 100 is made integral with the opposing portion 92 and the design portion 90. Further, the vertical rib 100 faces the second supporting hole 84 of the second supporting portion 52C of the tongue main body 40. Moreover, the vehicle front side surface of the vertical rib 100 is disposed at the same position as the respective vehicle front side surfaces of the first elastic piece 94 and the second elastic piece 96 in the vehicle front and rear direction.

<Operation and Effects of Present Exemplary Embodiment>

At the seatbelt device 12 to which the present tongue 10 is applied, when the body of the vehicle occupant 30 starts to move inertially toward the vehicle front side at the time of an emergency of the vehicle such as a time of a collision of the vehicle or the like, of the webbing 16, the lap webbing 32 that is applied to the waist portion of the body of the vehicle occupant is tensed in the arrow F direction in FIG. 6 by the body of the vehicle occupant 30. Due thereto, the clamp member 62 starts to rotate in the clamp rotation direction (the arrow B direction in FIG. 6) due to resistance (drag) between the clamp member 62 and the webbing 16. When the limiting rib 68 breaks due to the rotation of the clamp member 62 in the clamp rotation direction, as shown in FIG. 7, the position at which the guide bar 58 is disposed at the clamp member 62 is changed from the inner side of the supporting hole 64 at the clamp member 62 to the inner side of the guide hole 66.

In this state, when the clamp member 62 is tensed further by the webbing 16, as shown in FIG. 8, the clamp member 62 is guided by the guide bar 58, and is displaced toward the transverse direction one side of the guide bar 58 (the vehicle transverse direction inner side, the arrow A direction in FIG. 7). Due thereto, a thickness direction one side surface of the webbing 16 is pressed by the pressing portion 70 of the clamp member 62, and further, the webbing 16 is displaced, together with the clamp member 62, toward the transverse direction one side of the guide bar 58. Due thereto, the webbing 16 is nipped between and held by the pressing portion 70 of the clamp member 62 and both abutting portions and respective suppressing portions of the tongue main body 40. Due thereto, movement of the shoulder webbing 34 side portion of the webbing 16 toward the lap webbing 32 side can be limited, and the waist portion of the vehicle occupant 30 can be more effectively restrained by the lap webbing 32.

On the other hand, in the process of assembling the tongue 10 of the present exemplary embodiment, the clamp member 62 is disposed between the first supporting portion 52B and the second supporting portion 52C of the covering portion 52 of the tongue main body 40. In this state, the guide bar 58 is set near to the second supporting portion 52C from the vehicle rear side of the tongue main body 40, and the guide bar 58 is inserted into the second supporting hole 84 of the second supporting portion 52C from the vehicle front side portion of the guide bar 58. The vehicle front side portion of the guide bar 58 that has been passed-through the second supporting hole 84 is inserted into the supporting hole 64 of the clamp member 62. The vehicle front side end portion of the guide bar 58 that has been passed-through the supporting hole 64 of the clamp member 62 is set near to the first supporting portion 52B and is inserted into the first supporting hole 82. In this state, the vehicle rear side end portion of the guide bar 58 is disposed at the inner side of the second supporting hole 84 of the second supporting portion 52C. Due thereto, the vehicle front side end portion and the vehicle rear side end portion of the guide bar 58 are supported by the first supporting portion 52B and the second supporting portion 52C of the tongue main body 40.

Next, the cover 88 is set near to the cover attachment portion 86 of the covering portion 52 from the opposite assembly direction side, and the assembly direction side portion of the cover 88 is disposed between the transverse direction one side portion 86A and the transverse direction another side portion 86B of the cover attachment portion 86. Due to the cover 88 being set near to the cover attachment portion 86 of the covering portion 52 from the opposite assembly direction side in this way, the first elastic piece 94 and the second elastic piece 96 of the cover 88 are set near to the holding portion 98 of the second supporting portion 52C of the tongue main body 40. Due thereto, the first inclined surface portion 94E of the first elastic piece 94 is made to linearly contact the first corner portion 98D of the holding portion 98, and the second inclined surface portion 96E of the second elastic piece 96 is made to linearly contact the second corner portion 98E of the holding portion 98.

When the cover 88 is moved toward the assembly direction side in this state, the first inclined surface portion 94E of the first elastic piece 94 receives pushing reaction force F1 from the first corner portion 98D of the holding portion 98. This pushing reaction force F1 has a component F11 that is directed toward the cover 88 transverse direction one side. Due thereto, the first elastic piece 94 is elastically deformed toward the cover 88 transverse direction one side (the arrow W11 side in FIG. 4A) around deformation center X1 of the opposite assembly direction side portion of the first base portion 94A. Further, in this state, the second inclined surface portion 96E of the second elastic piece 96 receives pushing reaction force F2 from the second corner portion 98E of the holding portion 98. This pushing reaction force F2 has a component F21 that is directed toward the cover 88 transverse direction another side. Due thereto, the second elastic piece 96 is elastically deformed toward the cover 88 transverse direction another side (the arrow W21 side in FIG. 4A) around deformation center X2 of the opposite assembly direction side portion of the second base portion 96A.

Due to the first elastic piece 94 and the second elastic piece 96 of the cover 88 being elastically deformed so as to move away from one another in this way, the cover 88 can move in the assembly direction. The first elastic piece 94 and the second elastic piece 96 respectively are restored by their own elasticities, when the cover 88 is moved in this way, and the cover 88 transverse direction another side end of the first claw 94C of the first hook portion 94B of the first elastic piece 94 is moved further toward the assembly direction side than the cover 88 transverse direction one side end of the assembly direction side end of the first engaging portion 98B of the holding portion 98, and the cover 88 transverse direction one side end of the second claw 96C of the second hook portion 96B of the second elastic piece 96 is moved further toward the assembly direction side than the cover 88 transverse direction another side end of the assembly direction side end of the second engaging portion 98C of the holding portion 98.

Due thereto, the first claw 94C of the first hook portion 94B of the first elastic piece 94 is disposed further toward the cover 88 transverse direction another side than the cover 88 transverse direction one side end of the first engaging portion 98B of the holding portion 98, and the second claw 96C of the second hook portion 96B of the second elastic piece 96 is disposed further toward the cover 88 transverse direction one side than the cover 88 transverse direction another side end of the second engaging portion 98C of the holding portion 98. Due thereto, the first claw 94C of the first hook portion 94B of the first elastic piece 94 faces the first engaging portion 98B of the holding portion 98 in the assembly direction, and the second claw 96C of the second hook portion 96B of the second elastic piece 96 faces the second engaging portion 98C of the holding portion 98 in the assembly direction. Due thereto, the first hook portion 94B of the first elastic piece 94 and the second hook portion 96B of the second elastic piece 96 are held by the holding portion 98, and the cover 88 is assembled to the tongue main body 40, and movement of the cover 88 toward the opposite assembly direction side with respect to the tongue main body 40 is limited.

By the way, for example, at a time when the vehicle accelerates such as at the time when the vehicle starts moving or the like, or the like, the guide bar 58 starts to be displaced toward the vehicle rear side due to inertia. Due thereto, the cover 88 transverse direction both side portions of the vehicle rear side surface of the guide bar 58 abut the cover 88 transverse direction another side portion of the vehicle front side surface of the first elastic piece 94 and the cover transverse direction one side portion of the vehicle front side surface of the second elastic piece 96 of the cover 88, and the first elastic piece 94 and the second elastic piece 96 are pushed toward the vehicle rear side by the guide bar 58. The first elastic piece 94 and the second elastic piece 96 start to deform so as to move away from one another, due to the cover 88 transverse direction another side portion of the vehicle front side surface of the first elastic piece 94 and the cover 88 transverse direction one side portion of the vehicle front side surface of the second elastic piece 96 receiving such load.

Here, in the present exemplary embodiment, the vertical rib 100 is provided at the cover 88. The vertical rib 100 faces the second supporting hole 84 of the second supporting portion 52C of the tongue main body 40. The vehicle front side surface of the vertical rib 100 is disposed at the same position, in the vehicle front and rear direction, as the respective vehicle front side surfaces of the first elastic piece 94 and the second elastic piece 96. Therefore, at the time when the vehicle rear side surface of the guide bar 58 abuts the vehicle front side surface of the first elastic piece 94 and the vehicle front side surface of the second elastic piece 96, the cover 88 transverse direction central side portion of the vehicle rear side surface of the guide bar 58 abuts the vehicle front side surface of the vertical rib 100. Due thereto, the vertical rib 100 receives load toward the vehicle rear side from the guide bar 58, and displacement of the guide bar 58 toward the vehicle rear side is suppressed.

Due thereto, because the imparting of load toward the vehicle rear side from the guide bar 58 to the first elastic piece 94 and the second elastic piece 96 is suppressed, elastic deformation of the first elastic piece 94 and the second elastic piece 96 due to load from the guide bar 58 is suppressed. Due thereto, the state in which the first claw 94C of the first hook portion 94B of the first elastic piece 94 and the first engaging portion 98B of the holding portion 98 face (and/or engage, contact) one another, and the state in which the second claw 96C of the second hook portion 96B of the second elastic piece 96 and the second engaging portion 98C of the holding portion 98 face (and/or engage, contact) one another, can be maintained. Movement of the cover 88 toward the opposite assembly direction side with respect to the tongue main body 40, i.e., the cover 88 coming apart from the tongue main body 40, can be suppressed.

Further, the opposite assembly direction side end of the vertical rib 100 is connected to the assembly direction side end of the opposing portion 92 of the cover 88, and the vehicle rear side end of the vertical rib 100 is connected to the vehicle front side end of the design portion 90 of the cover 88. Due thereto, for example, the mechanical strength or the rigidity of the design portion 90 and the like of the cover 88 can be made to be large. Due thereto, for example, the design portion 90 can be made to be thin, or the cover 88 can be made to be compact or made to be light-weight, or the like.

Moreover, the vertical rib 100 is disposed between the first claw 94C of the first elastic piece 94 and the second claw 96C of the second elastic piece 96, and the assembly direction side end of the vertical rib 100 is disposed further toward the assembly direction side than the above-described deformation center X1 of the first elastic piece 94 and deformation center X2 of the second elastic piece 96. Therefore, even if the guide bar 58 that has been displaced toward the vehicle rear side tilts, and the portion, which is further toward the assembly direction side than the vertical rib 100, at the vehicle rear side end portion of the guide bar 58 pushes the first elastic piece 94 and the second elastic piece 96, the deformation center of the elastic deformation of the first elastic piece 94 in this case becomes further toward the assembly direction side than the deformation center X1, and the deformation center of the elastic deformation of the second elastic piece 96 becomes further toward the assembly direction side than the deformation center X2. Due thereto, the amounts of elastic deformation of the first elastic piece 94 and the second elastic piece 96 can be made to be small.

Figure 9A:
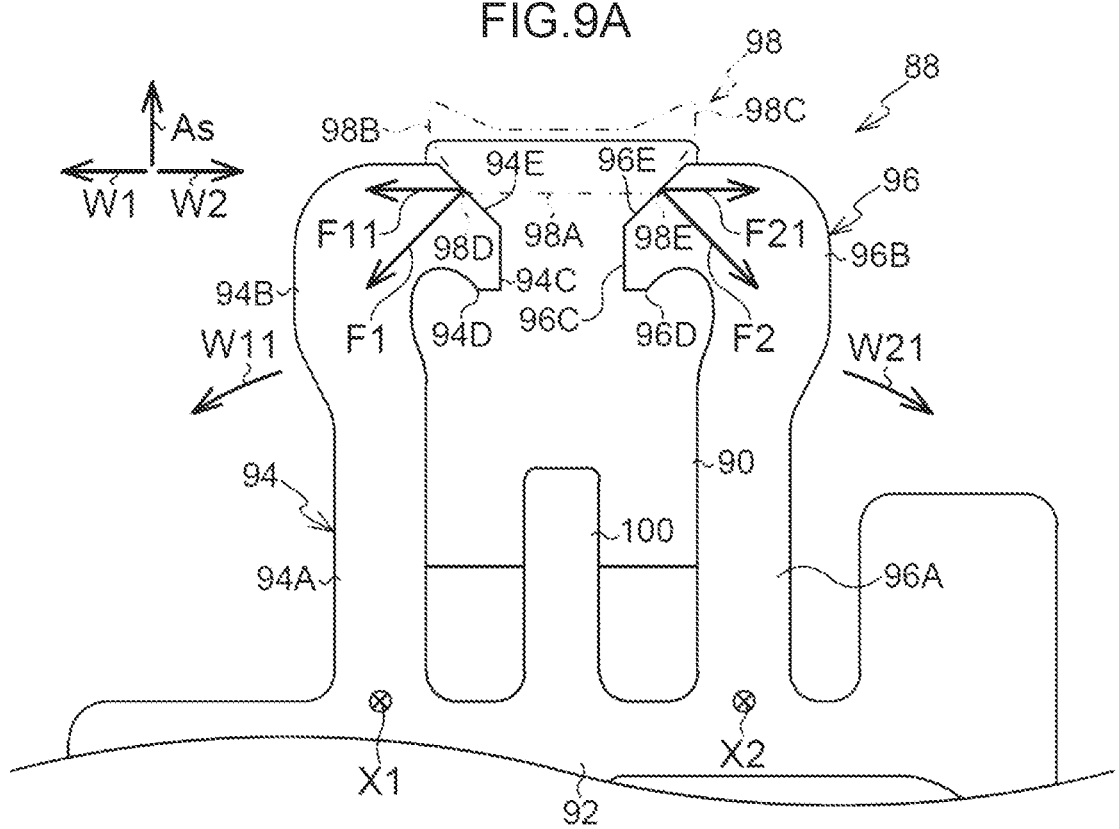
FIGS. 9A and 9B are front views in which the assembly direction side portion of the cover is seen from the vehicle front side.
Figure 9B:
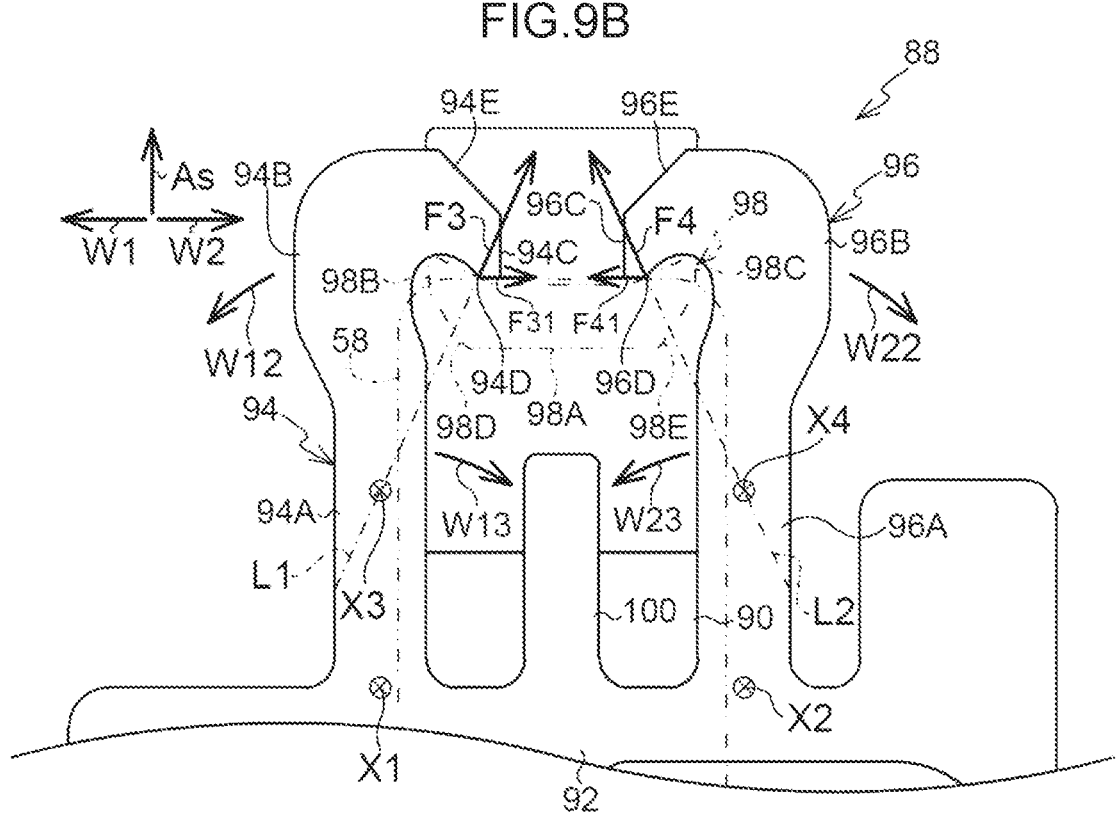

On the other hand, in the state in which the cover 88 is assembled to the cover attachment portion 86 of the tongue main body 40, if load toward the opposite assembly direction side is applied to the cover 88, as shown in FIG. 9B, the assembly direction side surface of the first engaging portion 98B of the holding portion 98 is pushed by the first claw corner portion 94D of the first claw 94C of the first elastic piece 94 of the cover 88, and the assembly direction side surface of the second engaging portion 98C of the holding portion 98 is pushed by the second claw corner portion 96D of the second claw 96C of the second elastic piece 96 of the cover 88. Due thereto, the first claw corner portion 94D of the first elastic piece 94 receives pushing reaction force (load) F3 from the assembly direction side surface of the first engaging portion 98B of the holding portion 98, and the second claw corner portion 96D of the second elastic piece 96 receives pushing reaction force (load) F4 from the assembly direction side surface of the second engaging portion 98C of the holding portion 98.

Due thereto, due to the first claw corner portion 94D of the first elastic piece 94 sliding toward the cover 88 transverse direction one side on the assembly direction side surface of the first engaging portion 98B of the holding portion 98, the first elastic piece 94 is elastically deformed toward the cover 88 transverse direction one side (the arrow W12 side in FIG. 9B). Due to the second claw corner portion 96D of the second elastic piece 96 sliding toward the cover 88 transverse direction another side on the assembly direction side surface of the second engaging portion 98C of the holding portion 98, the second elastic piece 96 is elastically deformed toward the cover 88 transverse direction another side (the arrow W22 side in FIG. 9B).

Here, the assembly direction side surface of the first engaging portion 98B of the holding portion 98 is a flat surface that is inclined toward the cover 88 transverse direction one side with respect to the assembly direction. Therefore, the aforementioned pushing reaction force F3 is inclined toward the cover 88 transverse direction another side with respect to the assembly direction. Thus, deformation center X3 of the elastic deformation of the first elastic piece 94, which deformation is due to the first claw corner portion 94D of the first elastic piece 94 sliding toward the cover 88 transverse direction one side on the assembly direction side surface of the first engaging portion 98B of the holding portion 98, is disposed on extension line L1 that extends from the first corner portion 98D of the first elastic piece 94 toward the side in the direction opposite the pushing reaction force F3 at the first base portion 94A of the first elastic piece 94.

Therefore, the deformation center X3, which is the center of deformation at the time when the first elastic piece 94 is elastically deformed due to the first claw corner portion 94D of the first elastic piece 94 sliding toward the cover 88 transverse direction one side on the assembly direction side surface of the first engaging portion 98B of the holding portion 98, becomes further toward the assembly direction side than the deformation center X1. Here, the distance to the deformation center X3 from the first claw corner portion 94D of the first elastic piece 94 that receives pushing reaction force from the assembly direction side surface of the first engaging portion 98B of the holding portion 98, is shorter than the distance from the first claw corner portion 94D to the deformation center X1. Therefore, the load that is needed in order to elastically deform the first elastic piece 94 around the deformation center X3 is greater than the load that is needed in order to elastically deform the first elastic piece 94 around the deformation center X1. Due thereto, elastic deformation of the first elastic piece 94, which is due to the first claw corner portion 94D of the first elastic piece 94 sliding toward the cover 88 transverse direction one side on the assembly direction side surface of the first engaging portion 98B of the holding portion 98, is suppressed.

Further, because the pushing reaction force F3 is inclined toward the cover 88 transverse direction another side with respect to the assembly direction, the pushing reaction force F3 has component F31 that is directed toward the cover 88 transverse direction another side. Therefore, at the first base portion 94A of the first elastic piece 94, elastically deformation occurs toward the cover 88 transverse direction another side (the arrow W13 side in FIG. 9B) around the deformation center X1 due to the pushing reaction force F3. Due thereto, elastic deformation of the first elastic piece 94 toward the cover 88 transverse direction one side, which is due to the first elastic piece 94 receiving the pushing reaction force (load) F3 from the assembly direction side surface of the first engaging portion 98B of the holding portion 98, can be suppressed.

On the other hand, the assembly direction side surface of the second engaging portion 98C of the holding portion 98 is a flat surface that is inclined toward the cover 88 transverse direction another side with respect to the assembly direction. Therefore, the aforementioned pushing reaction force F4 is inclined toward the cover 88 transverse direction one side with respect to the assembly direction. Thus, deformation center X4 of the elastic deformation of the second elastic piece 96, which deformation is due to the second claw corner portion 96D of the second elastic piece 96 sliding toward the cover 88 transverse direction another side on the assembly direction side surface of the second engaging portion 98C of the holding portion 98, is disposed on extension line L2 that extends from the second corner portion 98E of the second elastic piece 96 toward the side in the direction opposite the pushing reaction force F4, at the second base portion 96A of the second elastic piece 96.

Therefore, the deformation center X4, which is the center of deformation at the time when the second elastic piece 96 is elastically deformed due to the second claw corner portion 96D of the second elastic piece 96 sliding toward the cover 88 transverse direction another side on the assembly direction side surface of the second engaging portion 98C of the holding portion 98, becomes further toward the assembly direction side than the deformation center X2. Here, the distance to the deformation center X4 from the second claw corner portion 96D of the second elastic piece 96 that receives pushing reaction force from the assembly direction side surface of the second engaging portion 98C of the holding portion 98, is shorter than the distance from the second claw corner portion 96D to the deformation center X2. Therefore, the load that is needed in order to elastically deform the second elastic piece 96 around the deformation center X4 is greater than the load that is needed in order to elastically deform the second elastic piece 96 around the deformation center X2. Due thereto, elastic deformation of the second elastic piece 96, which is due to the second claw corner portion 96D of the second elastic piece 96 sliding toward the cover 88 transverse direction another side on the assembly direction side surface of the second engaging portion 98C of the holding portion 98, is suppressed.

Further, because the pushing reaction force F4 is inclined toward the cover 88 transverse direction one side with respect to the assembly direction, the pushing reaction force F4 has component F41 that is directed toward the cover 88 transverse direction one side. Therefore, at the second base portion 96A of the second elastic piece 96, elastically deformation occurs toward the cover 88 transverse direction one side (the arrow W23 side in FIG. 9B) around the deformation center X2 due to the pushing reaction force F4. Due thereto, elastic deformation of the second elastic piece 96 toward the cover 88 transverse direction another side, which is due to the second elastic piece 96 receiving the pushing reaction force (load) F4 from the assembly direction side surface of the second engaging portion 98C of the holding portion 98, can be suppressed.

In this way, in the present exemplary embodiment, elastic deformation of the first elastic piece 94 toward the cover 88 transverse direction one side, which is due to the first elastic piece 94 receiving the pushing reaction force (load) F3 from the assembly direction side surface of the first engaging portion 98B of the holding portion 98 can be suppressed. Elastic deformation of the second elastic piece 96 toward the cover 88 transverse direction another side, which is due to the second elastic piece 96 receiving the pushing reaction force (load) F4 from the assembly direction side surface of the second engaging portion 98C of the holding portion 98, can be suppressed. Therefore, in the state in which the cover 88 is assembled to the cover attachment portion 86 of the tongue main body 40, even if load toward the opposite assembly direction side is applied to the cover 88, the state in which the first claw 94C of the first hook portion 94B of the first elastic piece 94 and the first engaging portion 98B of the holding portion 98 face one another, and the state in which the second claw 96C of the second hook portion 96B of the second elastic piece 96 and the second engaging portion 98C of the holding portion 98 face one another, can be maintained. Movement of the cover 88 toward the opposite assembly direction side with respect to the tongue main body 40, i.e., the cover 88 coming apart from the tongue main body 40, can be suppressed.

Further, the deformation center X1 of the elastic deformation of the first elastic piece 94 at the time when the cover 88 is assembled to the tongue main body 40 is further away, than the aforementioned deformation center X3, from the abutment position at the first inclined surface portion 94E of the first elastic piece 94 at which the first corner portion 98D of the holding portion 98 abuts. The deformation center X2 of the elastic deformation of the second elastic piece 96 is further away, than the aforementioned deformation center X4, from the abutment position at the second inclined surface portion 96E of the second elastic piece 96 at which the second corner portion 98E of the holding portion 98 abuts. Therefore, the amounts of elastic deformation of the first elastic piece 94 and the second elastic piece 96 at the time when the cover 88 is being assembled to the tongue main body 40 becoming large can be suppressed, and the occurrence of and accumulation of strain of the first elastic piece 94 and the second elastic piece 96 due to elastic deformation of the first elastic piece 94 and the second elastic piece 96 can be suppressed.

Further, the first inclined surface portion 94E of the first elastic piece 94 of the cover 88, and the second inclined surface portion 96E of the second elastic piece 96, respectively are flat surfaces. Therefore, the change in the amount of increase of the elastic deformation amount of the first elastic piece 94 due to the first inclined surface portion 94E of the first elastic piece 94 receiving pushing reaction force from the first corner portion 98D of the holding portion 98 can be made to be small. The change in the amount of increase of the elastic deformation amount of the second elastic piece 96 due to the second inclined surface portion 96E of the second elastic piece 96 receiving pushing reaction force from the second corner portion 98E of the holding portion 98 can be made to be small.

Moreover, the respective assembly direction side surfaces of the first engaging portion 98B and the second engaging portion 98C of the holding portion 98 are flat surfaces. Therefore, the change in the amount of increase of the elastic deformation amount of the first elastic piece 94 due to the first claw corner portion 94D of the first elastic piece 94 of the cover 88 receiving pushing reaction force from the assembly direction side surface of the first engaging portion 98B can be made to be small. The change in the amount of increase of the elastic deformation amount of the second elastic piece 96 due to the second claw corner portion 96D of the second elastic piece 96 of the cover 88 receiving pushing reaction force from the assembly direction side surface of the second engaging portion 98C can be made to be small.

Note that, in the present exemplary embodiment, there are two elastic members, the first elastic piece 94 and the second elastic piece 96. However, for example, there may be one elastic member, and the number of elastic members is not particularly limited.

Further, in the present exemplary embodiment, the vehicle front side surface of the vertical rib 100 that serves as a load receiving portion is disposed at the same position in the vehicle front and rear direction as the respective vehicle front side surfaces of the first elastic piece 94 and the second elastic piece 96 that serve as elastic portion. The vehicle front side surface of the load receiving portion may be disposed further toward the vehicle front side than the vehicle front side surface of the elastic portion, or may be disposed further toward the vehicle rear side than the vehicle front side surface of the elastic portion.

Moreover, the present exemplary embodiment is structured such that the assembled member is the cover 88. However, the assembled member is not limited to the cover 88. A broad range of members can be used as the assembled member if the member is a member that is assembled to the tongue main body 40.

Moreover, in the present exemplary embodiment, the present disclosure is a structure that is applied to a tongue 10 for a seatbelt device. However, for example, the present disclosure may be applied to another structure of a seatbelt device, or may be applied to the assembling of an assembled member to a member to be assembled to that is a structure other than a seatbelt device.

What is claimed is:

1. A tongue for a seatbelt device, comprising:
    a tongue main body that has an insertion portion, which is configured to be inserted into a buckle of a seatbelt device, and an insert-through portion through which a webbing is inserted;
    an assembled member that is assembled to the tongue main body;
    a holding portion that is provided at one of the tongue main body or the assembled member;
    an elastic portion that is provided at another of the tongue main body or the assembled member,
        at a time at which the assembled member is being assembled to the tongue main body, the elastic portion being elastically deformed in a deforming direction by the holding portion, and,
        in a state in which the assembled member is assembled to the tongue main body, elastic deformation of the elastic portion in the deforming direction being cancelled, and the elastic portion being engaged with the holding portion and being held by the holding portion; and
    a load receiving portion that is provided at the tongue main body or the assembled member, and that, in the state in which the assembled member is assembled to the tongue main body, receives a load in a direction intersecting the deforming direction, and suppresses application of the load to the elastic portion.

2. The tongue for a seatbelt device of claim 1, further comprising a load imparting member that is configured to be displaced with respect to the one of the tongue main body or the assembled member,
    wherein
    the load receiving portion is disposed so as to face the load imparting member at a displacing direction side of the load imparting member, and, due to the load imparting member abutting the load receiving portion, displacement of the load imparting member is suppressed, and imparting of the load from the load imparting member to the elastic portion is suppressed.

3. The tongue for a seatbelt device of claim 2, wherein:
    the elastic portion provided at the another of the tongue main body or the assembled member has a pair of elastic members,
    the deforming direction of the elastic portion by the holding portion is a direction in which one of the elastic members moves away from another of the elastic members, and
    the load receiving portion is disposed between the pair of the elastic members.

4. The tongue for a seatbelt device of claim 3, wherein:
    the deforming direction of the elastic portion by the holding portion at the time at which the assembled member is being assembled to the tongue main body is a rotation direction whose center of rotation is a portion of the elastic portion, which portion is at a side opposite an application direction side of the load, and
    the load receiving portion is disposed further toward a side of the portion, to which the load is imparted, of the elastic portion than a center of rotation that is due to elastic deformation of the elastic portion.

5. The tongue for a seatbelt device of claim 4, further comprising:
    a clamp member that is provided at the tongue main body so as to be movable with respect to the tongue main body, and that, by being moved, nips the webbing between the tongue main body and the clamp member; and
    a supporting member that is provided at the tongue main body and supports the clamp member,
    wherein:
    the assembled member suppresses movement of the supporting member with respect to the tongue main body, and
    the load receiving portion receives the load that arises due to the supporting member moving with respect to the tongue main body.

6. The tongue for a seatbelt device of claim 2, wherein:
    the deforming direction of the elastic portion by the holding portion at the time at which the assembled member is being assembled to the tongue main body is a rotation direction whose center of rotation is a portion of the elastic portion, which portion is at a side opposite an application direction side of the load, and
    the load receiving portion is disposed further toward a side of the portion, to which the load is imparted, of the elastic portion than a center of rotation that is due to elastic deformation of the elastic portion.

7. The tongue for a seatbelt device of claim 2, further comprising:
    a clamp member that is provided at the tongue main body so as to be movable with respect to the tongue main body, and that, by being moved, nips the webbing between the tongue main body and the clamp member; and
    a supporting member that is provided at the tongue main body and supports the clamp member,
    wherein:
    the assembled member suppresses movement of the supporting member with respect to the tongue main body, and the load receiving portion receives the load that arises due to the supporting member moving with respect to the tongue main body.

8. The tongue for a seatbelt device of claim 1, wherein:
the elastic portion provided at the another of the tongue main body or the assembled member has a pair of elastic members,
the deforming direction of the elastic portion by the holding portion is a direction in which one of the elastic members moves away from another of the elastic members, and
the load receiving portion is disposed between the pair of the elastic members.

9. The tongue for a seatbelt device of claim 1, wherein:
the deforming direction of the elastic portion by the holding portion at the time at which the assembled member is being assembled to the tongue main body is a rotation direction whose center of rotation is a portion of the elastic portion, which portion is at a side opposite an application direction side of the load, and
the load receiving portion is disposed further toward a side of the portion, to which the load is imparted, of the elastic portion than a center of rotation that is due to elastic deformation of the elastic portion.

10. The tongue for a seatbelt device of claim 1, further comprising:
a clamp member that is provided at the tongue main body so as to be movable with respect to the tongue main body, and that, by being moved, nips the webbing between the tongue main body and the clamp member; and
a supporting member that is provided at the tongue main body and supports the clamp member,
wherein:
the assembled member suppresses movement of the supporting member with respect to the tongue main body, and
the load receiving portion receives the load that arises due to the supporting member moving with respect to the tongue main body.

11. A tongue for a seatbelt device, comprising:
a tongue main body that has an insertion portion, which is configured to be inserted into a buckle of a seatbelt device, and an insert-through portion through which a webbing is inserted;
an assembled member that is assembled to the tongue main body;
a holding portion that is provided at one of the tongue main body or the assembled member; and
an elastic portion that is provided at another of the tongue main body or the assembled member,
wherein:
the elastic portion is elastically deformed in a deforming direction by receiving load from an assembly direction side that is a side toward which the elastic portion is moved with respect to the holding portion at a time at which the assembled member is being assembled to the tongue main body,
in a state in which the assembled member is assembled to the tongue main body, the elastic deformation of the elastic portion in the deforming direction is cancelled, and the elastic portion is engaged with the holding portion and is held by the holding portion, and
a load from a side that is opposite from the assembly direction side, which is received from the holding portion, is applied to the elastic portion such that the elastic portion elastically deforms in a direction that is opposite from the deforming direction.

12. The tongue for a seatbelt device of claim 11, wherein an abutment portion of the holding portion, which abuts the elastic portion at a time at which the holding portion imparts the load from the side that is opposite from the assembly direction side to the elastic portion, is inclined, with respect to an assembly direction, toward an elastically deforming direction side of the elastic portion at the time at which the assembled member is being assembled to the tongue main body.

13. The tongue for a seatbelt device of claim 11, wherein the abutment portion of the holding portion, which abuts the elastic portion at the time at which the holding portion imparts the load from the side that is opposite from the assembly direction side to the elastic portion, is a flat surface.

14. The tongue for a seatbelt device of claim 11, further comprising:
a clamp member that is provided at the tongue main body so as to be movable with respect to the tongue main body, and that, by being moved, nips the webbing between the tongue main body and the clamp member; and
a supporting member that is provided at the tongue main body and supports the clamp member,
wherein the assembled member suppresses movement of the supporting member with respect to the tongue main body.

15. A tongue for a seatbelt device, comprising:
a tongue main body that has an insertion portion, which is configured to be inserted into a buckle of a seatbelt device, and an insert-through portion through which a webbing is inserted;
an assembled member that is assembled to the tongue main body;
a holding portion that is provided at one of the tongue main body or the assembled member; and
an elastic portion that is provided at another of the tongue main body or the assembled member,
wherein the elastic portion is elastically deformed around a first deformation fulcrum by receiving load from an assembly direction side that is a side toward which the elastic portion is moved with respect to the holding portion at a time at which the assembled member is being assembled to the tongue main body,
in a state in which the assembled member is assembled to the tongue main body, the elastic deformation of the elastic portion is cancelled, and the elastic portion is engaged with the holding portion and is held by the holding portion, and
a load from a side that is opposite from the assembly direction side, that is received from the holding portion, is applied to the elastic portion such that the elastic portion elastically deforms around a second deformation fulcrum that is further toward a side of an imparted position of the load from the side that is opposite from the assembly direction side than the first deformation fulcrum.

16. The tongue for a seatbelt device of claim 15, wherein an abutment portion of the holding portion, which abuts the elastic portion at a time at which the holding portion imparts the load from the side that is opposite from the assembly direction side to the elastic portion, is inclined, with respect to an assembly direction, toward an elastically deforming direction side of the elastic portion at the time at which the assembled member is being assembled to the tongue main body.

17. The tongue for a seatbelt device of claim 15, wherein the abutment portion of the holding portion, which abuts the elastic portion at the time at which the holding portion imparts the load from the side that is opposite from the assembly direction side to the elastic portion, is a flat surface.

18. The tongue for a seatbelt device of claim 15, further comprising:
- a clamp member that is provided at the tongue main body so as to be movable with respect to the tongue main body, and that, by being moved, nips the webbing between the tongue main body and the clamp member; and
- a supporting member that is provided at the tongue main body and supports the clamp member,
- wherein the assembled member suppresses movement of the supporting member with respect to the tongue main body.

* * * * *